United States Patent
Obot et al.

(10) Patent No.: US 10,988,670 B2
(45) Date of Patent: *Apr. 27, 2021

(54) CORROSION INHIBITION METHOD FOR DOWNHOLE METAL TUBING

(71) Applicant: KING FAHD UNIVERSITY OF PETROLEUM AND MINERALS, Dhahran (SA)

(72) Inventors: Ime Bassey Obot, Dhahran (SA); Saviour Alphonsus Umoren, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/796,469

(22) Filed: Feb. 20, 2020

(65) Prior Publication Data

US 2020/0362226 A1   Nov. 19, 2020

Related U.S. Application Data

(63) Continuation of application No. 16/415,396, filed on May 17, 2019, now Pat. No. 10,626,319.

(51) Int. Cl.
| | |
|---|---|
| *E21B 43/28* | (2006.01) |
| *C09K 8/54* | (2006.01) |
| *C09K 8/74* | (2006.01) |
| *C09K 8/70* | (2006.01) |
| *C23F 11/14* | (2006.01) |

(52) U.S. Cl.
CPC .................. *C09K 8/54* (2013.01); *C09K 8/74* (2013.01); *C09K 8/70* (2013.01); *C23F 11/149* (2013.01)

(58) Field of Classification Search
None
See application file for complete search history.

(56) References Cited

U.S. PATENT DOCUMENTS

| | | | |
|---|---|---|---|
| 4,957,640 | A | 9/1990 | Treybig et al. |
| 9,695,370 | B2 | 7/2017 | Anderson et al. |
| 2014/0262231 | A1 | 9/2014 | Alam et al. |

(Continued)

FOREIGN PATENT DOCUMENTS

EP    2 599 859 A1    6/2013

OTHER PUBLICATIONS

S. Zhang, et al., "New Pyrazine Derivatives as Efficient Inhibitors on Mild Steel Corrosion in Hydrochloric Medium" Chemical Engineering Transactions, vol. 55, 2016, pp. 289-294.

(Continued)

*Primary Examiner* — Charles R Nold
(74) *Attorney, Agent, or Firm* — Oblon, McClelland, Maier & Neustadt, L.L.P.

(57) ABSTRACT

A method of inhibiting corrosion of metal during acid stimulation of an oil and gas well, whereby the oil and gas well is treated with an acidic treatment fluid that includes 10 to 28 wt. % of an acid, based on a total weight of the acidic treatment fluid, and 0.01 to 5% of a pyrazine corrosion inhibitor by weight per total volume of the acidic treatment fluid, wherein the pyrazine corrosion inhibitor is 2,3-pyrazine dicarboxylic acid, pyrazine-2-carboxamide, 2-methoxy-3-(1-methylpropyl) pyrazine, or combinations thereof.

7 Claims, 22 Drawing Sheets

(56) References Cited

U.S. PATENT DOCUMENTS

2016/0130496 A1    5/2016  Holtsclaw et al.
2016/0177170 A1    6/2016  Janak et al.
2018/0127882 A1*   5/2018  Reyes ..................... C09K 8/54
2018/0273827 A1*   9/2018  Beuterbaugh ........... E21B 41/02

OTHER PUBLICATIONS

M. Abdallah, et al. "Corrosion inhibition of aluminum in hydrochloric acid by pyrazinamide derivatives" Journal of Molecular Liquids, vol. 223, Nov. 2016, pp. 1-2 (Abstract Only).

* cited by examiner

Pyrazine C

Pyrazine E

Pyrazine H

CORROSION INHIBITION METHOD FOR DOWNHOLE METAL TUBING

CROSS-REFERENCE TO RELATED APPLICATIONS

The present application is a Continuation of Ser. No. 16/415,396, now allowed, having a filing date of May 17, 2019.

STATEMENT OF ACKNOWLEDGEMENT

The authors would like to acknowledge the support received from King Abdulaziz City for Science and Technology (KACST) for funding this work under the National Science Technology Plan (NSTIP) grant No. 14-ADV2448-04. Also, the support provided by the Deanship of Scientific Research (DSR) and the Center of Research Excellence in Corrosion (CORE-C), at King Fahd University of Petroleum & Minerals (KFUPM) is gratefully acknowledged.

STATEMENT REGARDING PRIOR DISCLOSURE BY THE INVENTORS

Aspects of this technology are described in an article "Pyrazine derivatives as green oil field corrosion inhibitors for steel" published in Journal of Molecular Liquids, 2019, 277, 749-761, available online on Dec. 22, 2018, which is incorporated herein by reference in its entirety.

BACKGROUND OF THE INVENTION

Field of the Invention

The present invention relates to methods of inhibiting corrosion of metal during acid stimulation operations with acidic treatment fluids containing a pyrazine corrosion inhibitor.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Corrosion is a persistent issue in the oil and gas industry. This is because corrosion issues contribute to a significant portion of the annual budget of this industry. See M. Finsgar, J. Jackson, Application of corrosion inhibitors for steels in acidic media for the oil and gas industry: A review, Corros. Sci. 86 (2014) 17-41—incorporated herein by reference in its entirety. In this regard, employing suitable corrosion control measures can aid in preventing disasters such as spillages, loss of lives and other negative social impacts. See M. M. Osman, M. N. Shalaby, Some ethoxylated fatty acids as corrosion inhibitors for low carbon steel in formation water, Mater. Chem. Phys. 77 (2003) 261-269; P. C. Okafor, X. Liu, Y. G. Zheng, Corrosion inhibition of mild steel by ethylamino imidazoline derivative in CO2-saturated solution, Corros. Sci. 51 (2009) 761-768; and V. Garcia-Arriaga, J. Alvarez-Ramirez, M. Amaya, E. Sosa, H2S and 02 influence on the corrosion of carbon steel immersed in a solution containing 3M diethanolamine, Corros. Sci. 52 (2010) 2268-2279—each incorporated herein by reference in their entirety. Corrosion takes place at all production stages in oil and gas industries, that is, from downhole to surface equipment, processing and well treatments. See Z. Panossian, N. L. de Almeida, R. M. F. de Sousa, G. de S. Pimenta, L. B. S. Marques, Corrosion of carbon steel pipes and tanks by concentrated sulfuric acid: A review, Corros. Sci. 58 (2012) 1-11—incorporated herein by reference in its entirety. Well treatment procedures involving the use of either weak or strong acids to rejuvenate old wells and remove scales is termed acidizing. See E. Ituen, O. Akaranta, A. James, Electrochemical and anticorrosion properties of 5-hydroxytryptophan on mild steel in a simulated well-acidizing fluid, Integr. Med. Res. (2017) 1-13; Y. K. Choudhary, A. Sabhapondit, A. Kumar, Application of Chicory as Corrosion Inhibitor for Acidic Environments, Society of Petroleum Engineers, Paper No. SPE-155725-PA (2013) 268-276; and L. O. Olasunkanmi, M. F. Sebona, E. E. Ebenso, Influence of 6-phenyl-3(2H)-pyridazinone and 3-chloro-6-phenylpyrazine on mild steel corrosion in 0.5 M HCl medium: Experimental and theoretical studies, J. Mol. Struct. 1149 (2017) 549-559—each incorporated herein by reference in their entirety. During this treatment, acid is added into the well to enlarge existing flow pathways, open new ones, and also to remove scales. See Y. G. Avdeev, Y. I. Kuznetsov, A. K. Buryak, Inhibition of steel corrosion by unsaturated aldehydes in solutions of mineral acids, Corros. Sci. 69 (2013) 50-60; E. B. Ituen, O. Akaranta, S. A. Umoren, N-acetyl cysteine based corrosion inhibitor formulations for steel protection in 15% HCl solution, J. Mol. Liq. (2017)—each incorporated herein by reference in their entirety. By so doing pipes and other metallic structures are highly exposed to these corrosive acids leading to corrosion damage. See N. A. A. Ghany, M. F. Shehata, R. M. Saleh, A. A. El Hosary, Novel corrosion inhibitors for acidizing oil wells, Mater. & Corros. (2017) 355-360; U. Eduok, O. Faye, J. Szpunar, Corrosion inhibition of X70 sheets by a film-forming imidazole derivative at acidic pH, RSC Adv. 6 (2016) 108777-108790—each incorporated herein by reference in their entirety. The choice of acid for these treatments depends on the state of the well bore. Hydrochloric acid, sulfuric acid, acetic acid and hydrofluoric acid are some of the commonly used acids in these treatments. Hydrochloric acid is highly preferred to other acids since salts formed during the process are very soluble in water.

The concentration of the acids utilized in these stimulation treatments usually ranges between 15-28% which creates a corrosive environment and thus severe corrosion damage to carbon steel. Carbon steel is the most widely used steel due to its relatively cheap cost and abundance. To mitigate corrosion and related damage, chemical compounds, either organic or inorganic are added to these treatment acids. Numerous compounds such as quinolines, imidazolines, thioureas, pyridines and their various derivatives, alkenylphenones, amines, amides, acetylenic alcohols, and quaternary salts have been employed as corrosion inhibitors of carbon steel during stimulation treatments. See G. Schmitt, Application of Inhibitors for Acid Media: Report prepared for the European Federation of Corrosion Working Party on Inhibitors, Br. Corros. J. 19 (1984) 165-176; B. D. B. Tiu, R. C. Advincula, Polymeric corrosion inhibitors for the oil and gas industry: Design principles and mechanism, React. Funct. Polym. 95 (2015) 25-45; and W. Frenier, D. Hill, R. Jasinski, Corrosion Inhibitors for Acid Jobs, Oilf. Rev. 1 (1989) 15-21—each incorporated herein by reference in their entirety. Other corrosion inhibitors such as sulfoxides, thioethers, mercaptans, thiazoles, thiocyanates, and sulfonium compounds have also been used to combat corrosion. Historically, chromates and arsenate compounds are some of the inorganic compounds utilized in stimulation treatments, while acetylenic alcohols have been extensively utilized because of their relatively cheap cost and availability. Currently, propargyl alcohol and cinnamaldehyde are standard corrosion inhibitors for acid treatments. See A. Singha, M. A. Quraishi, Acidizing corrosion inhibitors: A review, J. Mater. Environ. Sci. 6 (2015) 224-235; and E. Barmatov, J. Geddes, T. Hughes, M. Nagl, Research on corrosion inhibitors for acid stimulation, NACE-Int. Corros. Conf. Ser. 6 (2012) 4604-4623—each incorporated herein by reference in their entirety.

However, the utilization of some of these compounds such as chromates, arsenates and sulfur containing compounds can be hazardous. Chromates have been shown to be carcinogenic, while arsenates are one of the main causes of arsenic poisoning. Also, some of the sulfur containing compounds are degraded in the acid treatment process, thereby forming $H_2S$ that facilitates penetration of hydrogen into the metal and leading to embrittlement. Due to these toxicity and degradation issues, a major focus has been drawn to green and environmental friendly organic corrosion inhibitor compounds.

Addition of these organic compounds to the corrosive media might impede the corrosion damage cause to metal surfaces. See A. Popova, M. Christov, A. Zwetanova, Effect of the molecular structure on the inhibitor properties of azoles on mild steel corrosion in 1M hydrochloric acid, Corros. Sci. 49 (2007) 2131-2143—incorporated herein by reference in its entirety. The molecules usually adsorb to the surface of the metal and form complexes through heterogeneous atoms such as phosphorus, sulfur, oxygen, nitrogen etc. See A. A. Farag, T. A. Ali, The enhancing of 2-pyrazinecarboxamide inhibition effect on the acid corrosion of carbon steel in presence of iodide ions, J. Ind. Eng. Chem. 21 (2015) 627-634; N. C. Oforka, O. K. Abiola, I. Chemistry, P. Harcourt, A. Chemistry, A study on the inhibition of mild steel corrosion in hydrochloric acid by pyridoxol hydrochloride Ecl. Quim., S§ o Paulo, 32 (2007) 31-38; and A. A. Al-taq, S. Aramco, S. A. Ali, K. Fahd, Inhibition Performance of a New Series of Mono-/Diamine-Based Corrosion Inhibitors for HCl Solutions, Society of Petroleum Engineers, SPE 114087-Paper (2009) 627-633—each incorporated herein by reference in their entirety. The inhibition effectiveness of the organic molecules is largely dependent upon interactions between the metal surface-molecule interface. See G. Avci, Corrosion inhibition of indole-3-acetic acid on mild steel in 0.5 M HCl, Colloids Surfaces A Physicochem. Eng. Asp. 317 (2008) 730-736—incorporated herein by reference in its entirety. Heterogeneous atoms with triple bonds and aromatic rings can form good coordination bonds with the surface of metals. Inhibition efficiency is directly proportional to the strength of the coordination bond, with higher coordination bond strengths generally resulting in higher inhibition efficiencies.

With the increased desire to use environmental friendly molecules, numerous studies have been focused on heterocyclic molecules, particularly those containing nitrogen. See F. Bentiss, M. Traisnel, L. Gengembre, M. Lagrenee, Inhibition of acidic corrosion of mild steel by 3,5-diphenyl-4H-1,2,4-triazole, Appl. Surf. Sci. 161 (2000) 194-202; A. S. Fouda, H. E. Gadow, Streptoquin and Septazole: Antibiotic drugs as corrosion inhibitors for copper in aqueous solution, Global J. Res. Engr: C Chem. Eng. 14 (2014) 20-36; K. M. Ismail, Evaluation of cysteine as environmentally friendly corrosion inhibitor for copper in neutral and acidic chloride solutions, Electrochim. Acta. 52 (2007) 7811-7819; A. K. Singh, M. A. Quraishi, Effect of Cefazolin on the corrosion of mild steel in HCl solution, Corros. Sci. 52 (2010) 152-160; C. Hao, R. H. Yin, Z. Y. Wan, Q. J. Xu, G. D. Zhou, Electrochemical and photoelectrochemical study of the self-assembled monolayer phytic acid on cupronickel B30, Corros. Sci. 50 (2008) 3527-3533—each incorporated herein by reference in their entirety. Nitrogen containing heterocyclic compounds such as quinoline, indole, benzimidazole, pyridine and their various derivatives have been shown to inhibit corrosion by adsorbing to the surface of the steel. See L. Wang, Evaluation of 2-mercaptobenzimidazole as corrosion inhibitor for mild steel in phosphoric acid, Corros. Sci. 43 (2001) 2281-2289; A. Popova, M. Christov, S. Raicheva, E. Sokolova, Adsorption and inhibitive properties of benzimidazole derivatives in acid mild steel corrosion, Corros. Sci. 46 (2004) 1333-1350; G. Moretti, 5-Amino- and 5-chloro-indole as mild steel corrosion inhibitors in 1 N sulphuric acid, Electrochim. Acta. 41 (1996) 1971-1980; and M. Dudukc, B. Yazici, M. Erbil, The effect of indole on the corrosion behaviour of stainless steel, Mater. Chem. Phys. 87 (2004) 138-141—each incorporated herein by reference in their entirety. Inhibitors mostly adsorb on the surface of steel through covalent or electrostatics bond formation. Several factors such as projected surface area of the molecules interacting with the metal, how the molecules are adsorbed, metal complex formation, size of the molecules, charge density etc. are responsible for the inhibition action of organic compounds. See M. Kissi, M. Bouklah, B. Hammouti, M. Benkaddour, Establishment of equivalent circuits from electrochemical impedance spectroscopy study of corrosion inhibition of steel by pyrazine in sulphuric acidic solution, Appl. Surf. Sci. 252 (2006) 4190-4197—incorporated herein by reference in its entirety.

Pyrazine and its derivatives have been used in a wide variety of applications such as organic photovoltaics and organic light emitting diodes, flavoring in food, fragrances, pharmaceutical and agro-based chemicals, ligands, and other derivatives of pyrazine such as those containing amides and sulfonamides are of significant interest in anti-tuberculosis and anti-diabetic drugs. See S. K. Saha, A. Hens, A. Roychowdhury, A. K. Lohar, Molecular Dynamics and Density Functional Theory Study on Corrosion Inhibitory Action of Three Substituted Pyrazine Derivatives on Steel Surface, Can. Chem. Trans. 2 (2014) 489-503—incorporated herein by reference in its entirety; S. C. Rasmussen, R. L. Schwiderski, M. E. Mulholland, Thieno[3,4-b]pyrazines and their applications to low band gap organic materials, Chem. Commun. 47 (2011) 11394; J. Li, Q. Li, D. Liu, Novel thieno-[3,4-b]-pyrazines cored dendrimers with carbazole dendrons: Design, synthesis, and application in solution-processed red organic light-emitting diodes, ACS Appl. Mater. Interfaces. 3 (2011) 2099-2107; T. Akiyama, Y. Enomoto, T. Shibamoto, A New Method of Pyrazine Synthesis for Flavor Use, J. Agric. Food Chem. 26 (1978) 1176-1179; T. B. Adams, S. M. Cohen, J. Doull, V. J. Feron, J. I. Goodman, L. J. Marnett, I. C. Munro, P. S. Portoghese, R. L. Smith, W. J. Waddell, B. M. Wagner, The FEMA GRAS assessment of benzyl derivatives used as flavor ingredients, Food Chem. Toxicol. 43 (2005) 1207-1240; T. Guilford, C. Nicol, M. Rothschild, B. P. Moore, The biological roles pf pyrazines: evidence for a worning odour function, Biol. J. Linn. Soc. 31 (1987) 113-128; R. Goel, V. Luxami, K. Paul, Recent advances in development of imidazo[1,2-a]pyrazines: synthesis, reactivity and their biological applications, Org. Biomol. Chem. 4 (2010) 1166-1169; W. W. K. R. Mederski, D. Kux, M. Knoth, J. Markus, Pyrido[3,4-b] pyrazines: A new application of 2-Chloro-3, 4-diaminopyridine, Heterocycles, 60 (2003) 925-932; P. J. Steel, C. M. Fitchett, Metallosupramolecular silver(I) assemblies based on pyrazine and related ligands, Coord. Chem. Rev. 252 (2008) 990-1006; and Y. Higashio, T. Shoji, Erratum: Heterocyclic compounds such as pyrrole, pyridines, pyrrolidine, piperidine, indole, imidazol and pyrazines (Applied Cataltysis A: General PII S0926860X01008158), Appl. Catal. A Gen. 260 (2004) 251-259—each incorporated herein by reference in their entirety. Data regarding cytotoxicity, antifungal and antituberculotic properties of pyrazine derivatives have been widely reported in literature. See M. Bouklah, A. Attayibat, S. Kertit, A. Ramdani, B. Hammouti, A pyrazine derivative as corrosion inhibitor for steel in sulphuric acid solution, Appl. Surf. Sci. 242 (2005) 399-406; D.-L. Du, D. A. Volpe, C. K. Grieshaber, M. J. Murphy Jr., Comparative toxicity of fostriecin, hepsulfam and pyrazine diazohydroxide to human and murine hematopoietic progenitor cells in vitro, Invest. New Drugs. 9 (1991) 149-157; A. Rey, C. Gouedard, N. Ledirac, M. Cohen, J. Dugay, J. Vial, V. Pichon, L. Bertomeu, D. Picq, D. Bontemps, F. Chopin, P. L. Carrette, Amine degradation in CO2 capture. 2. New degradation products of MEA. Pyrazine and alkylpyrazines: Analysis, mechanism of formation and toxicity, Int. J. Greenh. Gas Control. 19 (2013) 576-583; E. J. Moran, O. D. Easterday, B. L. Boser, Acute oral toxicity of Selected Flavour Chemicals, Drug Chem. Toxicol. 3 (2015) 249-258; and J. J. Kaminski, D. G. Perkins, J. D. Frantz, D. M. Solomon, A. J. Elliott, P. J. S. Chiu, J. F. Long, Antiulcer Agents. 3. Structure-Activity-Toxicity Relationships of Substituted Imidazo[1,2-a]pyridines and a Related Imidazo[1,2-a]pyrazine, J. Med. Chem. 30 (1987) 2047-2051—each incorporated herein by reference in their entirety. Moreover pyrazines are cost effective and environmentally friendly since they are widely used as flavoring agents in food.

Xianghong et al reported on the effectiveness of three pyrazine derivatives, that is, 2-aminopyrazine, 2-amino-5-bromopyrazine and 2-methylpyrazine in 1 M $H_2SO_4$ and concluded that these pyrazine molecules are generally effective corrosion inhibitors. See Xianghong Li, Shudduan Deng, and Hui Fu, Three pyrazine derivatives as corrosion inhibitors for steel in 1.0 M $H_2SO_4$ solution, Corrosion Science, 2011, 53 (10), 3241-3247—incorporated herein by reference in its entirety. 2-amino-5-bromopyrazine was found to be most effective followed by 2-aminopyrazine and finally 2-methylpyrazine as the least effective. Deng et al studied the inhibition efficiency of 2-amino-5-bromopyrazine and 2-aminopyrazine in 1M HCl and found out that these two pyrazine derivatives are good corrosion inhibitors and they observed that 2-amino-5-bromopyrazine was more effective compared to 2-aminopyrazine. See S. Deng, X. Li, H. Fu, Two pyrazine derivatives as inhibitors of the cold rolled steel corrosion in hydrochloric acid solution, Corros. Sci. 53 (2011) 822-828—incorporated herein by reference in its entirety. Kissi et al studied inhibition performance of diethylpyrazine-2,3-dicarboxylate in 0.5 M $H_2SO_4$ and found that efficiency increased with concentration of the inhibitor and the highest efficiency attained was 82% at a concentration of $5\times10^{-3}$M. See M. Kissi, M. Bouklah, B. Hammouti, M. Benkaddour, Establishment of equivalent circuits from electrochemical impedance spectroscopy study of corrosion inhibition of steel by pyrazine in sulphuric acidic solution, Appl. Surf. Sci. 252 (2006) 4190-4197—incorporated herein by reference in its entirety. Bouklah et al also studied the performance of diethylpyrazine-2,3-dicarboxylate in 0.5 M $H_2SO_4$ and found that diethylpyrazine-2,3-dicarboxylate adsorbs to the metal surface according to Langmuir model. See M. Bouklah, A. Attayibat, S. Kertit, A. Ramdani, B. Hammouti, A pyrazine derivative as corrosion inhibitor for steel in sulphuric acid solution, Appl. Surf. Sci. 242 (2005) 399-406—incorporated herein by reference in its entirerty. It was also observed that diethyl pyrazine-2,3-dicarboxylate acts as a cathodic inhibitor with efficiency up to 82%.

In view of the forgoing, there is a need for inexpensive, effective, and non-toxic corrosion inhibitors that can be used either alone or in corrosion inhibiting formulations in low dosages, for preventing corrosion of metal in various oil and gas field environments, including high temperature and highly acidic conditions common to acid stimulation operations.

SUMMARY OF THE INVENTION

Accordingly, it is one object of the present invention to provide novel methods of inhibiting corrosion of metal during acid stimulation of an oil and gas well using acidic treatment fluids containing high concentrations of acids and low concentrations of a cheap and non-toxic pyrazine corrosion inhibitor.

Thus, the present invention provides:

A method of inhibiting corrosion of metal during acid stimulation of an oil and gas well, the method involving treating the oil and gas well with an acidic treatment fluid comprising 10 to 28 wt. % of an acid, based on a total weight of the acidic treatment fluid, and 0.01 to 5% of a pyrazine corrosion inhibitor by weight per total volume of the acidic treatment fluid, wherein the pyrazine corrosion inhibitor is at least one selected from the group consisting of 2,3-pyrazine dicarboxylic acid, pyrazine-2-carboxamide, and 2-methoxy-3-(1-methylpropyl) pyrazine.

In some embodiments, the pyrazine corrosion inhibitor is present in the acidic treatment fluid in a concentration of 0.2 to 1% by weight per total volume of the acidic treatment fluid.

In some embodiments, the pyrazine corrosion inhibitor is 2,3-pyrazine dicarboxylic acid, and wherein 2,3-pyrazine dicarboxylic acid is present in the acidic treatment fluid in a concentration of 0.2 to 1% by weight per total volume of the acidic treatment fluid.

In some embodiments, the pyrazine corrosion inhibitor is pyrazine-2-carboxamide, and wherein pyrazine-2-carboxamide is present in the acidic treatment fluid in a concentration of 0.8 to 1% by weight per total volume of the acidic treatment fluid.

In some embodiments, the pyrazine corrosion inhibitor is 2-methoxy-3-(1-methylpropyl) pyrazine, and wherein 2-methoxy-3-(1-methylpropyl) pyrazine is present in the acidic treatment fluid in a concentration of 0.6 to 1% by weight per total volume of the acidic treatment fluid.

In some embodiments, the acidic treatment fluid consists of the acid and the pyrazine corrosion inhibitor in water or the acidic treatment fluid consists of the acid and the pyrazine corrosion inhibitor in an oil-in-water emulsion.

In some embodiments, the acidic treatment fluid further comprises 0.01 to 0.5% an intensifier by weight per total volume of the acidic treatment fluid, and wherein the intensifier is at least one selected from the group consisting of CuI, KI, and NaI.

In some embodiments, the intensifier is NaI.

In some embodiments, the acidic treatment fluid further includes 0.001 to 0.5% of a sulfur-containing compound by weight per total volume of the acidic treatment fluid, wherein the sulfur-containing compound is at least one selected from the group consisting of a mercapto amino acid or ester or peptide thereof, a mercapto heteroarene, a thioglycol compound, and a thiourea compound.

In some embodiments, the sulfur-containing compound is glutathione.

In some embodiments, the acidic treatment fluid further includes an intensifier and a sulfur-containing compound, and wherein the acidic treatment fluid is otherwise substantially free of a supplementary corrosion inhibitor, a surfactant, and organic solvent, and an additive.

In some embodiments, the acidic treatment fluid consists of the acid, the pyrazine corrosion inhibitor, an intensifier, and a sulfur-containing compound in water or the acidic treatment fluid consists of the acid, the pyrazine corrosion inhibitor, an intensifier, and a sulfur-containing compound in an oil-in-water emulsion.

In some embodiments, the acidic treatment fluid is an aqueous solution.

In some embodiments, the acidic treatment fluid is an oil-in-water emulsion.

In some embodiments, the acid is HCl and wherein the acidic treatment fluid comprises 14 to 16 wt. % HCl, based on a total weight of the acidic treatment fluid.

In some embodiments, the oil and gas well is treated with the acidic treatment fluid at a temperature of 25 to 180° C.

In some embodiments, the oil and gas well is treated with the acidic treatment fluid at a temperature of 55 to 65° C.

In some embodiments, the oil and gas well is treated with the acidic treatment fluid at a temperature of 85 to 95° C.

In some embodiments, the metal is carbon steel.

In some embodiments, the acidic treatment fluid is formed downhole by injecting the acid into the oil and gas well, followed by injecting the pyrazine corrosion inhibitor into the oil and gas well.

BRIEF DESCRIPTION OF THE DRAWINGS

The foregoing paragraphs have been provided by way of general introduction, and are not intended to limit the scope of the following claims. A more complete appreciation of the invention and many of the attendant advantages thereof will be readily obtained as the same becomes better understood by reference to the following detailed description when considered in connection with the accompanying drawings, wherein:

DETAILED DESCRIPTION OF THE INVENTION

Figure 1A:
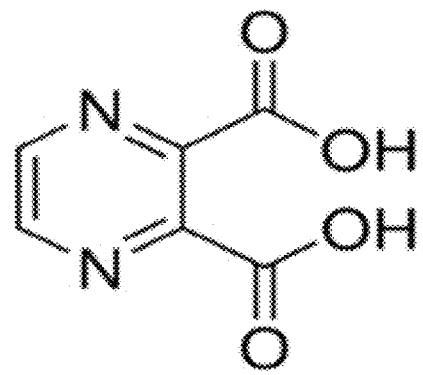
FIGS. 1A-1C illustrate the molecular structure of (A) pyrazine C, (B) pyrazine E and (C) pyrazine H.

In the following description, it is understood that other embodiments may be utilized and structural and operational changes may be made without departure from the scope of the present embodiments disclosed herein.

Definitions

As used herein, the term "fatty" describes a compound with a long-chain (linear) hydrophobic portion made up of hydrogen and anywhere from 6 to 26, 8 to 24, 10 to 22, 12 to 20, 14 to 18 carbon atoms, which may be fully saturated or partially unsaturated, and optionally attached to a polar functional group such as a hydroxyl group, an amine group, or a carboxyl group (e.g., carboxylic acid). Fatty alcohols, fatty amines, fatty acids, fatty esters, and fatty amides are examples of materials which contain a fatty portion, and are thus considered "fatty" compounds herein. For example, stearic acid, which has 18 carbons total (a fatty portion with 17 carbon atoms and 1 carbon atom from the —COOH group), is considered to be a fatty acid having 18 carbon atoms herein.

As used herein, "alkoxylated" or "alkoxylate" refers to compounds containing a (poly)ether group (i.e., (poly)oxyalkylene group) derived from reaction with, oligomerization of, or polymerization of one or more alkylene oxides having 2 to 4 carbon atoms, and specifically includes (poly)oxyethylene (derived from ethylene oxide, EO), (poly)oxypropylene (derived from propylene oxide, PO), and (poly) oxybutylene (derived from butylene oxide, BO), as well as mixtures thereof.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, yet even more preferably 0 wt. %, relative to a total weight of the composition being discussed.

As used herein, the terms "optional" or "optionally" means that the subsequently described event(s) can or cannot occur or the subsequently described component(s) may or may not be present (e.g., 0 wt. %).

The term "alkyl", as used herein, unless otherwise specified, refers to a straight, branched, or cyclic, aliphatic fragment having 1 to 26 carbon atoms, preferably 2 to 24, preferably 3 to 22, preferably 4 to 20, preferably 5 to 18, preferably 6 to 16, preferably 7 to 14, preferably 8 to 12, preferably 9 to 10. Non-limiting examples include, but are not limited to, methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, lauryl, myristyl, cetyl, stearyl, and the like, including guerbet-type alkyl groups (e.g., 2-methylpentyl, 2-ethylhexyl, 2-proylheptyl, 2-butyloctyl, 2-pentylnonyl, 2-hexyldecyl, 2-heptylundecyl, 2-octyldodecyl, 2-nonyltridecyl, 2-decyltetradecyl, and 2-undecylpentadecyl), and unsaturated alkenyl and alkynyl variants such as vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, oleyl, linoleyl, and the like. Cycloalkyl is a type of cyclized alkyl group. Exemplary cycloalkyl groups include, but are not limited to, cyclopropyl, cyclobutyl, cyclopentyl, cyclohexyl, norbornyl, and adamantyl. The term "lower alkyl" is used herein to describe alkyl groups having 1 to 5 carbon atoms (e.g., methyl, ethyl, n-propyl, etc.).

As used herein, unless otherwise specified, the term "aryl" refers to an aromatic group containing only carbon in the aromatic ring(s), such as phenyl, biphenyl, naphthyl, anthracenyl, and the like. The term "heteroarene" or "heteroaryl" refers to an arene compound or aryl group where at least one carbon atom is replaced with a heteroatom (e.g., nitrogen, oxygen, sulfur) and includes, but is not limited to, pyridine, pyrimidine, quinoline, isoquinoline, pyrazine, pyridazine, indole, pyrrole, oxazole, thiozole, furan, benzofuran, thiophene, benzothiophene, isoxazole, pyrazole, triazole, tetrazole, indazole, purine, carbazole, imidazole, benzothiozole, and benzimidazole.

As used herein, "alkanoyloxy" groups are alkanoyl groups that are bound to oxygen (—O—C(O)-alkyl), for example, acetyloxy, propionyloxy, butyryloxy, isobutyryloxy, pivaloyloxy, valeryloxy, hexanoyloxy, octanoyloxy, lauroyloxy, and stearoyloxy. "Alkoxycarbonyl" substituents are alkoxy groups bound to C=O (e.g. —C(O)—Oalkyl), for example methyl ester, ethyl ester, and pivaloyl ester substitution where the carbonyl functionality is bound to the rest of the compound.

As used herein, "optionally substituted" means that at least one hydrogen atom is replaced with a non-hydrogen group, provided that normal valencies are maintained and that the substitution results in a stable compound. Such optional substituents may be selected from aryl, alkoxy, aryloxy, arylalkyloxy, alkanoyloxy, carboxy, alkoxycarbonyl, hydroxy, halo (e.g. chlorine, bromine, fluorine or iodine), amino (e.g. alkylamino, arylamino, arylalkylamino, alkanoylamino, either mono- or disubstituted), oxo, amido (e.g. —CONH$_2$, —CONHalkyl, —CONHaryl, —CONHarylalkyl or cases where there are two substituents on one nitrogen), and the like.

As used herein the term "corrosion inhibitor" refers to a substance(s) that prevents or reduces the deterioration of a metal surface by oxidation or other chemical reaction. Corrosive substances that can cause corrosion, particularly of metal surfaces of equipment used during stimulation operations, include water with high salt contents, acidic inorganic compounds such as hydrochloric acid, hydrofluoric acid, carbon dioxide ($CO_2$) and/or hydrogen sulfide ($H_2S$), organic acids, and microorganisms. Preferred corrosion inhibitors of the present invention reduce, inhibit and/or prevent the destructive effect such substances have on various metal surfaces.

As used herein, the phrase "acid stimulation" or "acidizing" refers to the general process of introducing an acidic fluid downhole to perform at least one of the following functions: (1) to react with and to dissolve the area surrounding the well which has been damaged; (2) to react with and to dissolve rock associated with the geological formation to create small conducting channels (e.g., conducting wormholes) through which the hydrocarbon will flow; and (3) to create a large flow channel by injecting acidic fluids through the well at pressures sufficient to fracture the rock, thus allowing the hydrocarbon to migrate rapidly from the rock to the well. Thus, "acid stimulation" or "acidizing" may refer to either or both matrix acidizing and fracture acidizing treatments.

Methods of Inhibiting Corrosion

Petroleum oil and natural gas wells are typically subjected to numerous chemical treatments during their production life to enhance operation and protect the integrity of the well and all related equipment. Acidic fluids (HCl, HF, etc.) are often used in stimulation operations such as in matrix acidizing and fracture acidizing treatments, where acidic fluids are injected into the well penetrating the rock pores to stimulate the well to improve flow or to remove damage. In matrix acidizing treatments, acidic treatment fluids are either injected into the well to react with and to dissolve the area surrounding the well to remove damage around the wellbore, or introduced into the subterranean formation under pressure (but below the fracture pressure) so that the acidic treatment fluids flow into the pore spaces of the formation and react with acid-soluble materials contained in the formation, resulting in an increase in the size of the pore spaces and an increase in the permeability of the formation. In fracture-acidizing treatments, the acidic treatment fluids are introduced above the fracture point of the formation to etch flow channels in the fracture face of the formation and to enlarge the pore spaces in the formation. The increase in formation permeability from these types of acidic treatments may increase the recovery of hydrocarbons from the formation. In most cases, acid stimulation procedures are carried out in calcareous formations such as dolomites, limestones, dolomitic sandstones, and the like.

A common problem associated with using acidic treatment fluids in subterranean formations is the corrosion of metal surfaces in piping, tubing, heat exchangers, reactors, downhole tools, and the other equipment which are exposed to such acid treatments. Further, other corrosive components such as brines, carbon dioxide, hydrogen sulfide, and microorganisms, may be entrained within the acidic stimulation fluids during stimulation, exacerbating the corrosion problem. Moreover, elevated temperatures are commonly encountered in deeper formations which increases the rate of corrosion. Corrosion issues are problematic for any drilling operation, but are even more troublesome in deep-sea operations where replacement of corroded equipment is difficult and costly.

Therefore, it is common practice to employ corrosion inhibitors during acid stimulation treatments of crude oil and natural gas wells. However, many corrosion inhibitors suffer from poor performance at low concentrations and particularly poor performance under high temperatures and under strongly acidic solutions, for example acidic solutions containing greater than or equal to 15 wt. % acid, necessitating the need for large quantities of corrosion inhibitors to be used. The use of large quantities of corrosion inhibitors is extremely undesirable when corrosion inhibitors are deployed in terms of both cost and from environmental concerns.

The present disclosure thus provides a method for inhibiting corrosion during acid stimulation in an oil and gas field. The methods involve treating or otherwise introducing an acidic treatment fluid containing an acid and a pyrazine corrosion inhibitor into an oil and gas well.

Acidic Treatment Fluid

The acidic treatment fluid of the present disclosure generally contains an acid and a pyrazine corrosion inhibitor. The acidic treatment fluid may optionally include an intensifier, a sulfur-containing compound, or both. The acidic treatment fluid may further optionally include one or more of a supplemental corrosion inhibitor, a surfactant, an organic solvent, and an additive.

Acid

The acidic treatment fluid may contain a variety of acids, preferably water-soluble acids. Suitable acids include, but are not limited to, hydrochloric acid, formic acid, acetic acid, chloroacetic acid, hydrofluoric acid, sulfuric acid, sulfamic acid, as well as mixtures thereof, for example mud acid (mixtures of HCl and HF). In preferred embodiments, the acid is hydrochloric acid (HCl). Typically, the acidic treatment fluid contains 5 to 28 wt. % of the acid, preferably 7 to 24 wt. % of the acid, preferably 9 to 22 wt. % of the acid, preferably 10 to 20 wt. % of the acid, preferably 12 to 18 wt. % of the acid, preferably 14 to 16 wt. %, preferably 15 wt. % of the acid(s) (e.g., HCl), based on a total weight of the acidic treatment fluid, although more concentrated (e.g., about 37 wt. %) or dilute versions may also be used in some circumstances. In some embodiments, the acidic treatment fluid has a pH of less than 3, preferably less than 2, preferably less than 1, preferably less than 0, for example from −2 to 0, or from −1 to 0.

In some embodiments, when the acidic treatment fluids are employed in the acid stimulation methods of the present disclosure, formation chemicals and fluids may become entrained therein. Therefore, in addition to the acid(s) listed above, the acidic treatment fluids may also contain other corrosive agents, including, but not limited to, carbon dioxide, corrosive sulfur species (e.g., hydrogen sulfide, mercaptans, etc.), brine, as well as mixtures thereof.

In some embodiments, the acidic treatment fluid is an aqueous solution, i.e., is substantially free of an oil phase (e.g., contains less than 1 wt. %, preferably less than 0.5 wt. %, more preferably less than 0.1 wt. %, even more preferably less than 0.05 wt. %, yet even more preferably 0 wt. % of an oil phase, based on a total weight of the acidic treatment fluid). Preferably, the acidic treatment fluid is injected into the oil and gas well as an aqueous solution for acid stimulation operations, and in doing so, only minor amounts of produced oil and gas from the geological formation is entrained therein.

In some embodiments, the acidic treatment fluid is a multi-phase mixture containing an aqueous phase and an oil phase (and in some cases a gas phase), one example being an emulsion. Such multi-phase mixtures may also be effective for acid stimulation operations and simultaneously inhibiting corrosion of metal. In some embodiments, the acidic treatment fluid is an emulsion, preferably a stable emulsion. In preferred embodiments, the acidic treatment fluid is an oil-in-water emulsion. In some embodiments, the acidic treatment fluid contains at least 5 wt. %, preferably at least 10 wt. %, preferably at least 15 wt. %, preferably at least 20 wt. %, preferably at least 25 wt. %, and up to 45 wt. %, preferably up to 40 wt. %, preferably up to 35 wt. %, preferably up to 30 wt. % of an oil phase, based on a total weight of the acidic treatment fluid.

The oil phase may include a natural oil, a synthetic oil, or both. Examples of oils from natural sources include, but are not limited to, kerosene, diesel oils, crude oils, gas oils, fuel oils, paraffin oils, mineral oils, low toxicity mineral oils, other petroleum distillates, and any combination thereof. Examples of synthetic oils include, but are not limited to, polyolefins, polydiorganosiloxanes, siloxanes, organosiloxanes, as well as mixtures thereof.

Pyrazine Corrosion Inhibitor

The methods disclosed herein utilize pyrazine corrosion inhibitors, preferably pyrazine corrosion inhibitors which are soluble in water. The choice of pyrazine as a corrosion inhibitor is based on its planar structure that can easily adsorb to the metal surface, $sp^2$ hybridized orbitals that can donate electrons to empty d-orbital of the metal, and the availability of N atom. The pyrazine corrosion inhibitors of the present disclosure may be one or more of 2,3-pyrazine dicarboxylic acid (also referred to herein as pyrazine C), pyrazine-2-carboxamide (also referred to herein as pyrazine E), and 2-methoxy-3-(1-methylpropyl) pyrazine (also referred to herein as pyrazine H).

The pyrazine corrosion inhibitor may be used in any amount sufficient to provide a desired anticorrosive effect. Typically, highly effective anticorrosion effects are achieved when the pyrazine corrosion inhibitor is employed in amounts 0.01 to 5%, preferably 0.03 to 4%, preferably 0.05 to 3%, preferably 0.08 to 2%, preferably 0.1 to 1.5%, preferably 0.15 to 1.3%, preferably 0.2 to 1.2%, preferably 0.3 to 1.1%, preferably 0.4 to 1%, preferably 0.5 to 0.9%, preferably 0.55 to 0.8%, preferably 0.6 to 0.7%, by weight per total volume of the acidic treatment fluid. Of course, dosages above or below these values may be used in some circumstances, when appropriate.

In some embodiments, the pyrazine corrosion inhibitor is 2,3-pyrazine dicarboxylic acid. In some embodiments, the 2,3-pyrazine dicarboxylic acid is present in the acidic treatment fluid in a concentration of 0.2 to 1%, preferably 0.4 to 0.9%, preferably 0.6 to 0.8%, preferably 0.7 to 0.75%, by weight per total volume of the acidic treatment fluid.

In some embodiments, the pyrazine corrosion inhibitor is pyrazine-2-carboxamide. In some embodiments, the pyrazine-2-carboxamide is present in the acidic treatment fluid in a concentration of 0.8 to 1%, preferably 0.82 to 0.98%, preferably 0.84 to 0.96%, preferably 0.86 to 0.94%, preferably 0.88 to 0.92%, by weight per total volume of the acidic treatment fluid.

In some embodiments, the pyrazine corrosion inhibitor is 2-methoxy-3-(1-methylpropyl) pyrazine. In some embodiments, the 2-methoxy-3-(1-methylpropyl) pyrazine is present in the acidic treatment fluid in a concentration of 0.6 to 1%, preferably 0.65 to 0.95%, preferably 0.7 to 0.9%, preferably 0.75 to 0.85%, preferably 0.79 to 0.81% by weight per total volume of the acidic treatment fluid.

Without being bound by theory, the pyrazine corrosion inhibitor may be a mixed-type inhibitor, i.e., may adsorb to the surface of the metal and reduce both the cathodic and anodic reactions that cause corrosion, and may thus remain effective at such extremely low dosages. In some embodiments, such as with 2,3-pyrazine dicarboxylic acid and/or 2-methoxy-3-(1-methylpropyl) pyrazine, the pyrazine corrosion inhibitor may be a mixed-type inhibitor, but may function to inhibit corrosion predominantly through the reduction of cathodic reactions. In some embodiments, such as with pyrazine-2-carboxamide, the pyrazine corrosion inhibitor may be a mixed-type inhibitor, but may function to inhibit corrosion predominantly through the reduction of anodic reactions.

Mixtures of pyrazine corrosion inhibitors may be employed in the methods herein. In some embodiments, a mixture of two of 2,3-pyrazine dicarboxylic acid, pyrazine-2-carboxamide, and 2-methoxy-3-(1-methylpropyl) pyrazine may be employed, preferably a mixture of 2,3-pyrazine dicarboxylic acid and pyrazine-2-carboxamide in a ratio of 10:1 to 1:10, preferably 8:1 to 1:8, preferably 6:1 to 1:6, preferably 4:1 to 1:4, preferably 3:1 to 1:3, preferably 2:1 to 1:2, preferably 1:1. In some embodiments, a mixture of 2,3-pyrazine dicarboxylic acid, pyrazine-2-carboxamide, and 2-methoxy-3-(1-methylpropyl) pyrazine may be employed (a mixture of pyrazine C, E, and H). For example, the mixture may contain 10 to 70 wt. %, preferably 20 to 60 wt. %, preferably 30 to 50 wt. % of 2,3-pyrazine dicarboxylic acid, 5 to 45 wt. %, preferably 15 to 35 wt. %, preferably 20 to 30 wt. % of pyrazine-2-carboxamide, and 5 to 45 wt. %, preferably 15 to 35 wt. %, preferably 20 to 30 wt. % of 2-methoxy-3-(1-methylpropyl) pyrazine, each based on a total weight of the mixture (weight sum of pyrazine C+pyrazine E+pyrazine H).

In some embodiments, the pyrazine corrosion inhibitor is the only corrosion inhibitor present in the acidic treatment fluid. In some embodiments, the acidic treatment fluid consists essentially of, or consists of, the acid and the pyrazine corrosion inhibitor in water (the acidic treatment fluid is an aqueous solution of the acid and the pyrazine corrosion inhibitor). In some embodiments, the acidic treatment fluid consists essentially of, or consists of, the acid and the pyrazine corrosion inhibitor in an oil-in-water emulsion (the acidic treatment fluid is an emulsion of the acid the pyrazine corrosion inhibitor in oil and water).

Intensifier

In some situations, for example, under particularly harsh conditions, the acidic treatment fluid may optionally further include an intensifier to further diminish the rate of corrosion. Intensifiers generally do not by themselves impart anticorrosive effects, but rather, when used in combination with a corrosion inhibitor, promote or enhance the anticorrosive properties of such corrosion inhibitors. Suitable intensifiers may include, but are not limited to, monocarboxylic acid compounds having 1 to 12 carbon atoms or an ester (including protected carboxylic acid derivatives) or salt thereof, such as formic acid, acetic acid, glycolic acid, propionic acids/esters/salts (e.g., propionic acid, 2-hydroxypropionic acid, 3-hydroxypropionic acid, 2-methoxypropionic acid, 3-methoxypropionic acid, 2-hydroxypropionic acid methyl ester, 3-hydroxypropionic acid methyl ester, 2-methoxypropionic acid methyl ester, 3-methoxypropionic acid methyl ester, sodium 2-hydroxypropionate, sodium 3-hydroxypropionate, sodium 2-methoxypropionate, and sodium 3-methoxypropionate), lactic acid, butanoic acid, isobutyric acid, pentanoic acid, 2,2-bis(hydroxymethyl)butanoic acid, 2,2-bis(hydroxymethyl)propionic acid, 2-amino-2,4,5-trideoxypentonic acid, 2-methylserine, 3-(acryloyloxy)propanoic acid, 3-ethoxy-2-methyl-3-oxopropanoic acid, 3-ethoxypropanoic acid, 3-hydroxy-2-(hydroxymethyl)-2-methylpropanoic acid, 3-hydroxy-2,2-dimethylpropanoic acid, 3-hydroxy-2-oxopropanoic acid, 3-hydroxy-3-methylbutanoic acid, 3-hydroxybutanoic acid, 3-hydroxyproline, 3-methoxy-2-methyl-3-oxopropanoic acid, 3-methoxy-3-oxopropanoic acid, 3-methoxyalanine, 3-methoxybutanoic acid, 3-methoxypropanoic acid, 3-methoxyvaline, 4-amino-3-hydroxybutanoic acid, 4-hydroxy-4-methyltetrahydro-2H-pyran-2-one, ethyl 3-ethoxypropanoate, ethyl 3-hydroxybutanoate, hydroxydihydro-2(3H)-furanone, lithium 3-hydroxy-2-oxopropanoate, methyl 2-(1-hydroxyethyl)acrylate, methyl 2-amino-3-hydroxybutanoate, methyl 2-amino-3-hydroxypropanoate hydrochloride, methyl 3, 3-dimethoxypropanoate, methyl 3-hydroxy-2-(hydroxymethyl)-2-methylpropanoate, methyl 3-hydroxy-2,2-dimethylpropanoate, methyl 3-hydroxyhexanoate, methyl 3-methoxypropanoate, N-acetylserine, potassium 3-methoxy-3-oxopropanoate, serine, sodium 3-hydroxybutanoate, and threonine, for example, those monocarboxylic acids/esters/salts/protected derivatives described in WO 2007007025 A1—incorporated herein by reference in its entirety;

formates such as $C_1$-$C_4$ alkyl formates (e.g., methyl formate and ethyl formate), aryl formates, and arylalkyl formates (e.g., benzyl formate);

formamides such as formamide, dimethyl formamide, 1,1'-azobisformamide;

metal halides such as sodium chloride, sodium bromide, potassium bromide, sodium iodide, potassium iodide, copper(I) chloride, copper(I) iodide, copper(II) chloride, copper(II) iodide, antimony chloride;

as well as combinations thereof.

When employed, the intensifier is preferably at least one selected from the group consisting of CuI, KI, and NaI, more preferably NaI.

The intensifier may be pre-mixed with the acid, the pyrazine corrosion inhibitor, and any other optional component to form the acidic treatment fluid above hole, and the pre-made acidic treatment fluid may be introduced into the oil and gas well. Alternatively, the intensifier may be added to the oil and gas well as a separate component and the acidic treatment fluid containing the intensifier may be formed downhole upon mixing.

When employed, the intensifier may be present in a concentration of 0.01 to 1%, preferably 0.05 to 0.5%, preferably 0.08 to 0.4%, preferably 0.09 to 0.3%, preferably 0.1 to 0.25%, preferably 0.15 to 0.2% by weight per total volume of the acidic treatment fluid.

In some embodiments, the acidic treatment fluid is substantially free of an intensifier. In some embodiments, the acidic treatment fluid is substantially free of a monocarboxylic acid compound having 1 to 12 carbon atoms or an ester or salt derivative thereof. In some embodiments, the acidic treatment fluid is substantially free of a metal halide (e.g., NaI, CuI, KI).

Sulfur-Containing Compound

The acidic treatment fluid may optionally further include a sulfur containing compound, which may act to prevent oxidative processes that can lead to corrosion, for example. The sulfur containing compound may be present in the acidic treatment fluid in an amount of 0.001 to 0.5%, preferably 0.002 to 0.4%, preferably 0.004 to 0.3%, preferably 0.006 to 0.2%, preferably 0.008 to 0.1%, preferably 0.01 to 0.09%, preferably 0.02 to 0.08%, preferably 0.05 to 0.07% by weight per total volume of the acidic treatment fluid.

Acceptable sulfur-containing compounds that may be employed in the acidic treatment fluids herein include, but are not limited to, a mercapto amino acid or ester or peptide thereof, such as cysteine, homocysteine, N-acetyl cysteine, a di-, tri-, or polypeptide of cysteine and at least one other amino acid (leucine, isoleucine, lysine, threonine, methionine, phenylalanine, valine, tryptophan, histidine, asparagine, alanine, arginine, aspartic acid, cysteine, glutamic acid, glutamine, proline, glycine, tyrosine, and serine), for example, glutathione (reduced), γ-glutamylcysteine, and the like;

a mercapto heteroarene such as any benzoxazole, benzothiazole, benzoimidizole, thiadiazole, triazole, tetrazole, pyridine, pyrimidine, quinoline, isoquinoline, pyrazine, pyridazine, indole, pyrrole, oxazole, thiozole, furan, benzofuran, thiophene, benzothiophene, isoxazole, pyrazole, indazole, purine, carbazole, or imidazole which contains mercapto functionality (—SH), with specific mention being made to mercaptobenzoxazole, mercaptobenzothiazole, mercaptobenzoimidazole, 2,5-mercapto-1,3,4-thiadiazole, 1-phenyl-5-mercapto-1H-tetrazole, 5-methyl-1,3,4-thiadiazole-2-thiol, 3-mercapto-4-methyl-4H-1,2,4-triazole, 2-amino-5-mercapto-1,3,4-thiadiazole, 4-mercaptopyridine, and 2-mercaptopyridine;

a thioglycol compound such as 2-mercaptoethanol, an S-alkyl thioglycol, an O-alkyl thioglycol, a thioglycol alkoxylate, or a thiodiglycol alkoxylated, with specific mention being made to 2-mercaptoethanol, 2-(methylthio)ethanol, 2-(ethylthio)ethanol, thioglycol ethoxylate, thioglycol propoxylate, thioglycol butoxylate, thiodiglycol ethoxylate, thiodiglycol propoxylate, thiodiglycol butoxylate;

a thiourea compound, for example, thiourea, N-methylthiourea, N,N'-dimethylthiourea, tetramethylthiourea, N-ethylthiourea, N,N'-diethylthiourea, tetraethylthiourea, N-propylthiourea, N,N'-dipropylthiourea, N-butylthiourea, N,N'-dibutylthiourea, imidazolidine-2-thione, and tetrahydropyrimidine-2(1H)-thione; and mixtures thereof.

In preferred embodiments, when employed, the sulfur-containing compound is glutathione.

In some embodiments, the acidic treatment fluids may be formulated with a mixture of two or more sulfur-containing compounds, for example as a mixture of a first and second sulfur-containing compound in a molar ratio of 10:1 to 1:10, preferably 8:1 to 1:8, preferably 6:1 to 1:6, preferably 4:1 to 1:4, preferably 2:1 to 1:2, preferably about 1:1.

When employed, a weight ratio of the pyrazine corrosion inhibitor to the sulfur-containing compound may be from 20:1 to 200:1, preferably 40:1 to 160:1, preferably 60:1 to 140:1, preferably 80:1 to 120:1, preferably 100:1.

In some embodiments, the acidic treatment fluid is substantially free of a sulfur-containing compound (e.g., glutathione).

In some embodiments, the acidic treatment fluid consists of the acid, the pyrazine corrosion inhibitor, an intensifier, and a sulfur-containing compound in water. In some embodiments, the acidic treatment fluid consists of the acid, the pyrazine corrosion inhibitor, an intensifier, and a sulfur-containing compound in an oil-in-water emulsion.

Supplementary Corrosion Inhibitor

The acidic treatment fluid may also optionally include a supplementary corrosion inhibitor, which is a term used herein to define any substance/compound which imparts or is expected to impart a material anticorrosive effect when included in the acidic treatment fluid, other than the pyrazine corrosion inhibitor and the sulfur-containing compound described above. Therefore, as used herein, the terms pyrazine corrosion inhibitor, sulfur-containing compound, and supplementary corrosion inhibitor are meant to be distinct and separate terms. When used, the supplementary corrosion inhibitor may be present in amounts of 0.01 to 15%, preferably 0.05 to 10%, preferably 0.1 to 8%, preferably 0.5 to 5%, preferably 1 to 2% by weight based on a total volume of the acidic treatment fluid.

Any corrosion inhibitor known to those of ordinary skill in the art may be used herein as a supplementary corrosion inhibitor. Exemplary supplementary corrosion inhibitors include, but are not limited to, a cinnamaldehyde compound, which are those compounds which contain an optionally substituted aryl group separated from an aldehyde moiety (or protecting group thereof) by one unsaturated carbon-carbon double bond, with said aryl group being unsubstituted (contain only hydrogen as is the case in cinnamaldehyde) or substituted with up to 5 substituents individually selected from the group consisting of an optionally substituted alkyl, an optionally substituted aryl, an optionally substituted alkoxy, an optionally substituted alkanoyloxy, a carboxy, an optionally substituted alkoxycarbonyl, a hydroxy, a halo, an amino group which may be unsubstituted, monosubstituted, or disubstituted, a nitro, a cyano, a sulfate anion, an alkylsulfate, a thiocyano, an optionally substituted alkylthio, an optionally substituted alkylsulfonyl, an optionally substituted arylsulfonyl, or an optionally substituted sulfonamido (e.g., —$SO_2NH_2$), or wherein two adjacent substituents together form a methylene dioxy group, with specific mention being made to cinnamaldehyde, 3,3'-(1,4-phenylene)diacrylaldehyde, p-hydroxycinnamaldehyde, p-methylcinnamaldehyde, p-ethylcinnamaldehyde, p-methoxycinnamaldehyde, 2,4,5-trimethoxycinnamaldehyde, 3,4,5-trimethoxycinnamaldehyde, 3,4-dimethoxycinnamaldehyde, 1-ethoxy-2-acetoxycinnamaldehyde, 1-ethoxy-2-hydroxycinnamaldehyde, sinapaldehyde, 2,5-dimethoxy-3,4-methylenedioxycinnamaldehyde, 2-methoxy-4,5-methylenedioxy cinnamaldehyde, coniferyl aldehyde, 2,3-dimethoxy-4,5-methylenedioxycinnamaldehyde, p-dimethylaminocinnamaldehyde, p-diethylaminocinnamaldehyde, p-nitrocinnamaldehyde, o-nitrocinnamaldehyde, 3,4-methylenedioxycinnamaldehyde, sodium p-sulfocinnamaldehyde, p-trimethylammoniumcinnamaldehyde, p-trimethylammoniumcinnamaldehyde o-methylsulfate, p-thiocyanocinnamaldehyde, p-chlorocinnamaldehyde, α-methylcinnamaldehyde, β-methylcinnamaldehyde, α-chlorocinnamaldehyde, α-bromocinnamaldehyde, α-butylcinnamaldehyde, α-amylcinnamaldehyde, α-hexylcinnamaldehyde, α-bromo-p-cyanocinnamaldehyde, α-ethyl-p-methylcinnamaldehyde, and p-methyl-α-pentylcinnamaldehyde;

an alkoxylated fatty amine, which are compounds having a long-chain alkyl group made up of hydrogen and anywhere from 6 to 26 carbon atoms, preferably 8 to 22 carbon atoms, preferably 12 to 20 carbon atoms, more preferably 16 to 18 carbon atoms, bonded to an amine functional group which is alkoxylated, where the fatty portion may be derived/derivable from fatty acids or fatty acid mixtures such as caprylic acid, capric acid, lauric acid, myristic acid, palmitic acid, stearic acid, arachidic acid, behenic acid, lignoceric acid, cerotic acid, myristoleic acid, palmitoleic acid, sapienic acid, oleic acid, elaidic acid, vaccenic acid, linoleic acid, linoelaidic acid, α-inolenic acid, arachidonic acid, eicosapentaenoic acid, erucic acid, docosahexaenoic acid, tall oil fatty acid (TOFA), coconut oil fatty acid, tallow fatty acid, and soya fatty acid, and thus may saturated or may contain sites of unsaturation (e.g., mono-, di-, tri-, oligo-, or poly-unsaturated), with specific mention being made to a coconut amine alkoxylate, a stearyl amine alkoxylate, a palmitoleylamine alkoxylate, a oleylamine alkoxylate, a tallow amine alkoxylate, a tall oil amine alkoxylate, a laurylamine alkoxylate, a myristylamine alkoxylate, a cetylamine alkoxylate, a stearylamine alkoxylate, a linoleyl amine alkoxylate, a soya amine alkoxylate, as well as alkoxylated ethylene diamine variants thereof, alkoxylated trimethylene diamine variants thereof, alkoxylated diethylene triamine variants thereof, and alkoxylated dipropylene triamine variants thereof;

an imidazoline compound, which are those compounds which can be generally formed from a reaction between (i) a fatty acid or an ester derivative thereof, for example a $C_1$ to $C_{12}$ alkyl ester (e.g., methyl, ethyl, etc.) of a fatty acid or a glycerol ester of a fatty acid, and (ii) a polyamine which contains at least one ethylene diamine group (in various molar ratios between (i) and (ii)), such as those imidazoline compounds prepared from reaction between (i) tall oil fatty acid (TOFA), coconut oil fatty acid, tallow fatty acid, soya fatty acid, and/or oleic acid and (ii) any polyamine containing two, three, four, or more nitrogen groups, which may be primary, secondary, or tertiary amines, so long as at least one ethylene diamine group is present that is capable of reacting with a carboxylic acid group to form an imidazoline structure (e.g., ethylene diamine, β-hydroxyethyl ethylene diamine, 1,2-diaminopropane, 1,2-diaminocyclohexane, 2,3-diaminobutane, 2,3-diaminobutan-1-ol, propane-1,2,3-triamine, tris(2-aminoethyl)amine, tetraethylenepentamine (TEPA), diethylenetriamine (DETA), triethylentetramine (TETA), aminoethylethanolamine (AEEA), pentaethylene hexamine (PEHA), and hexaethylene heptamine (HEHA)), with specific mention being made to 1:1 (molar ratio) TOFA/DETA imidazoline, 2:1 TOFA/DETA imidazoline, 1:1 TOFA/TETA imidazoline, 2:1 TOFA/TETA imidazoline, 2:1 TOFA/TETA bis-imidazoline, 1:1 TOFA/TEPA imidazoline, 2:1 TOFA/TEPA imidazoline, 2:1 TOFA/TEPA bis-imidazoline, 3:1 TOFA/TEPA bis-imidazoline, 1:1 TOFA/AEEA imidazoline, 2:1 TOFA/AEEA imidazoline, 1:1 TOFA polyamine imidazoline, 2:1 TOFA/polyamine imidazoline, 2:1 TOFA/polyamine bis-imidazoline, 3:1 TOFA/TEPA polyamine bis-imidazoline, 1:1 Soya/DETA imidazoline, 2:1 Soya/DETA imidazoline, 1:1 Soya/TETA imidazoline, 2:1 Soya/TETA imidazoline, 2:1 Soya/TETA bis-imidazoline, 1:1 Soya/TEPA imidazoline, 2:1 Soya/TEPA imidazoline, 2:1 Soya/TEPA bis-imidazoline, 3:1 TOFA/TEPA bis-imidazoline, 1:1 Soya/AEEA imidazoline, 2:1 Soya/AEEA imidazoline, 1:1 Soya/polyamine imidazoline, 2:1 Soya/polyamine imidazoline, 2:1 Soya/polyamine bis-imidazoline, 1:1 Tallow/DETA imidazoline, 2:1 Tallow/DETA imidazoline, 1:1 Tallow/TETA imidazoline, 2:1 Tallowv/TETA imidazoline, 2:1 Tallow/TETA bis-imidazoline, 1:1 Tallow/TEPA imidazoline, 2:1 Tallow/TEPA imidazoline, 2:1 Tallow/TEPA bis-imidazoline, 3:1 Tallow/TEPA bis-imidazoline, 1:1 Tallow/AEEA imidazoline, 2:1 Tallow/AEEA imidazoline, 1:1 Tallow/polyamine imidazoline, 2:1 Tallow/polyamine imidazoline, 2:1 Tallow/polyamine bis-imidazoline, 3:1 Tallow/TEPA polyamine bis-imidazoline;

inorganic metal or organometallic compounds such as chromates, arsenates, and zinc salts;

phosphorous-containing compounds such as (poly)phosphates and phosphonates;

acetylenic alcohols such as propargylic (propargyl) alcohol, pent-4-yn-1-ol, hexynol, ethyl octynol, octynol, 3-phenyl-2-propyn-1-ol;

aldehydes (other than cinnamaldehydes above) such as crotonaldehyde and aromatic aldehydes such as furfural and p-anisaldehyde;

phenones including alkenyl phenone such as β-hydroxypropiophenone, phenyl vinyl ketone;

nitrogen-containing heterocycles (other than the imidazoline and the pyrazine corrosion inhibitors described above) such as piperazine and hexamethylene tetramine;

quaternized heteroarenes (e.g., 1-(benzyl)quinolinium chloride);

condensation products of carbonyls and amines (e.g., Schiff bases);

polymers, including those obtained from natural sources such as chitin, collagen, pectin, plant gums such as gum Arabic and guar gum;

as well as mixtures thereof.

In preferred embodiments, the acidic treatment fluid is substantially free of supplementary corrosion inhibitors.

Surfactant

The acidic treatment fluid may optionally include one or more surfactants. Preferably, surfactants are employed when acidic treatment fluids are used as oil-in-water emulsions. The surfactant(s), when present, may be included in an amount of 0.001 to 5%, preferably 0.005 to 3%, preferably 0.01 to 1%, preferably 0.1 to 0.5%, preferably 0.2 to 0.4% by weight based on a total volume of the acidic treatment fluid. Cationic, anionic, non-ionic, and/or amphoteric surfactants may be employed herein.

Cationic surfactants may include, but are not limited to a protonated amine formed from a reaction between a $C_6$-$C_{26}$ alkyl amine compound and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, etc.), such as protonated salts of $C_6$-$C_{26}$ alkyl monoamines, $C_6$-$C_{26}$ alkyl (poly)alkylene polyamines, and alkoxylated fatty amines;

a protonated $C_6$-$C_{26}$ alkyl amidoamine formed from a reaction between a $C_6$-$C_{26}$ alkyl amidoamine compound and an acid (for example the acids listed above), such as protonated forms of the amide reaction product between any fatty acid previously listed (or ester derivative thereof) with a polyamine (e.g., putrescine, cadaverine, ethylene diamine, $N^1,N^1$-dimethylethane-1,2-diamine, $N^1,N^1$-dimethylpropane-1,3-diamine, $N^1,N^1$-diethylethane-1,2-diamine, $N^1,N^1$-diethylpropane-1,3-diamine, spermidine, 1,1,1-tris(aminomethyl)ethane, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine), with specific mention being made to protonated forms of stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachidamidoethyldiethylamine, and arachidamidoethyldimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, etc.) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with specific mention being made to a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, and cetylpyridinium chloride;

as well as mixtures thereof.

Anionic surfactants may include, but are not limited to:

sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols such as sodium dodecyl sulfate, sodium laureth sulfate, ammonium lauryl sulfate, potassium lauryl sulfate, sodium myreth sulfate;

sulfonates such as dodecyl benzene sulfonate, lower alkyl-benzene sulfonates, alpha olefin sulfonates, lignosulfonates, sulfo-carboxylic compounds;

phosphates of fatty alcohols or polyoxyalkylene ethers of fatty alcohols such as cetyl phosphate salts, dicetyl phosphate salts, ceteth-10-phosphate salts;

carboxylate salts of fatty acids, acylamino acids, lactylates, and/or fatty alcohols/polyoxyalkylene ethers of fatty alcohols such as sodium stearate, sodium behenoyl lactylate, sodium isostearoyl lactylate, sodium caproyl lactylate, sodium laureth-5 carboxylate, sodium laureth-6 carboxylate, sodium laureth-11 carboxylate;

and mixtures thereof.

Non-ionic surfactants may include, but are not limited to:

alkanolamides of fatty acids, that is, amide reaction products between a fatty acid and an alkanolamine compound, such as coconut fatty acid monoethanolamide (e.g., N-methyl coco fatty ethanol amide), coconut fatty acid diethanolamide, oleic acid diethanolamide, and vegetable oil fatty acid diethanolamide;

alkoxylated alkanolamides of fatty acids, preferably ethoxylated and/or propoxylated variants of the alkanolamides of fatty acids using for example anywhere from 2 to 30 EO and/or PO molar equivalents, preferably 3 to 15 EO and/or PO molar equivalents, preferably 4 to 10 EO and/or PO molar equivalents, preferably 5 to 8 EO and/or PO molar equivalents per moles of the alkanolamide of the fatty acid (e.g., coconut fatty acid monoethanolamide with 4 moles of ethylene oxide);

amine oxides, such as N-cocoamidopropyl dimethyl amine oxide and dimethyl $C_6$-$C_{22}$ alkyl amine oxide (e.g., dimethyl coco amine oxide);

fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters;

ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols;

and mixtures thereof.

Amphoteric surfactants may include, but are not limited to:

$C_6$-$C_{22}$ alkyl dialkyl betaines, such as fatty dimethyl betaines (R—N(CH$_3$)$_2$($^+$)—CH$_2$COO$^-$), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium);

$C_6$-$C_{22}$ alkyl amido betaines (R—CO—NH—CH$_2$CH$_2$CH$_2$—N(CH$_3$)$_2$($^+$)—CH$_2$COO$^-$ or R—CO—NH—CH$_2$CH$_2$—N(CH$_3$)$_2$($^+$)—CH$_2$COO$^-$), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine;

$C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3^-$ or R—CO—NH—CH$_2$CH$_2$CH$_2$—N(CH$_3$)$_2$($^+$)—CH$_2$CH$_2$CH$_2$SO$_3^-$ or R—CO—NH—CH$_2$CH$_2$—N $(CH_3)_2(^+)$—$CH_2CH_2CH_2SO_3^-$) or a hydroxysulfonic group (R—N$(CH_3)_2(^+)$—$CH_2CH(OH)$—$CH_2SO_3^-$ or R—CO—NH—$CH_2CH_2CH_2$—N$(CH_3)_2(^+)$—$CH_2CH(OH)$—$CH_2SO_3^-$ or R—CO—NH—$CH_2CH_2$—N$(CH_3)_2(^+)$—$CH_2CH(OH)$—$CH_2SO_3^-$), such as $C_{10}$-$C_{18}$ dimethyl hydroxysultaine and $C_{10}$-$C_{18}$ amido propyl dimethylamino hydroxysultaine;

and mixtures thereof.

In some embodiments, the acidic treatment fluid is substantially free of a surfactant.

Organic Solvent

In preferred embodiments, the base solvent of the acidic treatment fluid is water. However, the acidic treatment fluid may also optionally include one or more organic solvents, which may aid solvation of the various ingredients and/or facilitate transfer of the active ingredients to the appropriate location within the wellbore or geological formation. In preferred embodiments, organic solvent(s) may be added in amounts of 1 to 30 vol. %, preferably 3 to 25 vol. %, preferably 5 to 20 vol. %, preferably 8 to 16 vol. %, preferably 10 to 14 vol. %, based on a total volume of the acidic treatment fluid. The organic solvent may be at least one selected from the group consisting of a polar aprotic solvent, an aromatic solvent, a terpineol, a mono alcohol with 1 to 12 carbon atoms, and a polyol with 2 to 18 carbon atoms.

Acceptable organic solvents include, but are not limited to, formamide, dimethyl formamide, dimethyl acetamide, acetone, methyl ethyl ketone, methanol, ethanol, propanol, isopropanol, n-butanol, isobutanol, n-pentanol, n-hexanol, terpineol, menthol, prenol, 3-methyl-3-buten-1-ol, 2-ethyl-1-hexanol, 2-ethyl-1-butanol, 2-propylheptan-1-ol, 2-butyl-1-octanol, ethylene glycol, diethylene glycol, triethylene glycol, tetraethylene glycol, ethylene glycol methyl ether, ethylene glycol ethyl ether, ethylene glycol propyl ether, ethylene glycol butyl ether, diethylene glycol monomethyl ether, diethylene glycol monoethyl ether, propylene glycol, dipropylene glycol, propylene glycol monomethyl ether, pyrocatechol (1,2-benzenediol), resorcinol (1,3-benzenediol), phenol, cresol, benzyl alcohol, 1,3-propanediol, 1,3-butanediol, 2-butoxyethanol, 1,4-butanediol, 1,6-hexanediol, glycerol, pentaerythritol, manitol, sorbitol, as well as mixtures thereof. In preferred embodiments, the organic solvent is at least one selected from the group consisting of acetone, methyl ethyl ketone, methanol, ethanol, propanol, isopropanol, n-butanol, isobutanol, ethylene glycol, and diethylene glycol.

In preferred embodiments, the acidic treatment fluid is substantially free of an organic solvent.

Additives

The acidic treatment fluids may optionally further include one or more additives to modify the properties or functions of the acidic treatment fluid, as needed. Typically, when present, the additive(s) may be incorporated in an amount of less than 10, preferably less than 8%, preferably less than 6%, preferably less than 4%, preferably less than 2%, preferably less than 1%, preferably less than 0.5%, preferably less than 0.1% by weight per total volume of the acidic treatment fluid.

Additive(s) suitable for use in oil and gas well operations are known by those of ordinary skill in the art, and may include, but are not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan) as well as synthetic polymer gelling agents (e.g., polyacrylamides and co-polymers thereof, see U.S. Pat. No. 7,621,334—incorporated herein by reference in its entirety), psyllium husk powder, hydroxyethyl cellulose, carboxymethylcellulose, and polyanionic cellulose, poly(diallyl amine), diallyl ketone, diallyl amine, styryl sulfonate, vinyl lactam, laponite;

chelating agents, such as chelating agents useful as sequesteration agents of metal ions, for example iron control agents, such as ethylene diamine tetraacetic acid (EDTA), diethylene triamine pentaacetic acid (DPTA), hydroxyethylene diamine triacetic acid (EDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA);

stabilizing agents e.g., polypropylene glycol, polyethylene glycol, carboxymethyl cellulose, hydroxyethyl cellulose, polysiloxane polyalkyl polyether copolymers, acrylic copolymers, alkali metal alginates and other water soluble alginates, carboxyvinyl polymers, polyvinylpyrollidones, polyacrylates;

dispersing agents e.g., polymeric or co-polymeric compounds of polyacrylic acid, polyacrylic acid/maleic acid copolymers, styrene/maleic anhydride copolymers, polymethacrylic acid and polyaspartic acid;

scale inhibitors e.g., sodium hexametaphosphate, sodium tripolyphosphate, hydroxyethylidene diphosphonic acid, aminotris(methylenephosphonic acid (ATMP), vinyl sulfonic acid, allyl sulfonic acid, polycarboxylic acid polymers such as polymers containing 3-allyloxy-2-hydroxy-propionic acid monomers, sulfonated polymers such as vinyl monomers having a sulfonic acid group, polyacrylates and co-polymers thereof;

defoaming agents e.g., silicone oils, silicone oil emulsions, organic defoamers, emulsions of organic defoamers, silicone-organic emulsions, silicone-glycol compounds, silicone/silica adducts, emulsions of silicone/silica adducts;

emulsifiers such as a tallow amine, a ditallow amine, or combinations thereof, for example a 50% concentration of a mixture of tallow alkyl amine acetates, C16-C18 (CAS 61790-60) and ditallow alkyl amine acetates (CAS 71011-03-5) in a suitable solvent such as heavy aromatic naphtha and ethylene glycol;

as well as mixtures thereof.

In some embodiments, the acidic treatment fluid is substantially free of an additive (e.g., viscosity modifying agents, chelating agents, stabilizing agents, dispersing agents, scale inhibitors, and/or defoaming agents). In some embodiments, the acidic treatment fluid is substantially free of polymers, including both water-soluble and oil-soluble polymers. In preferred embodiments, the acidic treatment fluid is substantially free of a polysaccharide (e.g., xanthan gum, scleroglucan, and diutan), a synthetic polymer (e.g., polyacrylamides and co-polymers thereof), and a quaternary ammonium surfactant.

Oil and Gas Well

The pyrazine corrosion inhibitor of the present disclosure may be deployed during any upstream (exploration, field development, and production operations), midstream (transportation e.g., by pipeline, processing, storage, and distribution), or downstream (manufacturing, refining, wholesale)

oil and gas process where metal corrosion is a concern. However, the pyrazine corrosion inhibitor has been found to be particularly effective at combating corrosion caused by concentrated acidic fluids, and thus are advantageously employed during upstream processes, more preferably during acid stimulation treatments where corrosion caused by highly acidic mediums is a primary concern, even more preferably during matrix acidizing treatments.

In some embodiments, the acidic treatment fluid may be an aqueous solution of the acid and the pyrazine corrosion inhibitor, and any optional components.

However, one common problem associated with conventional acidizing treatment systems is that deeper penetration into the formation is not usually achievable because the acid may be spent before it can deeply penetrate into the subterranean formation. For instance, conventional acidizing fluids, such as those that contain sulfuric acid, hydrochloric acid, or a mixture of such acids with hydrofluoric acid, have high acid strength and quickly react with the formation itself, fines and damage nearest the well bore, and often times do not penetrate the formation to a desirable degree before becoming spent. To achieve improved results, it may often be desirable to maintain the acidic solution in a reactive condition for as long a period as possible to maximize the degree of penetration so that the permeability enhancement produced by the acidic solution may be increased. The emulsified state of the acid makes it diffuse at much slower rate, thereby retarding the chemical reaction rate with the formation. Therefore, in some embodiments, the acidic treatment fluid is a multiphase mixture comprising an oil phase and an aqueous phase, for example, an emulsion.

In some embodiments, the acidic treatment fluids may be injected down the annulus of a well and optionally flushed with solvent. In some embodiments, the acidic treatment fluid is pre-formed above well by combining the acid (aq.) and the pyrazine corrosion inhibitor, and any optional components, followed by injecting the pre-formed acidic treatment fluid downhole for the acid stimulation operation. In some embodiments, the acid (aq.) and the pyrazine corrosion inhibitor (and any optional components) are injected downhole as separate streams, combining downhole to form the acidic treatment fluid for acid stimulation. The pyrazine corrosion inhibitor may be injected before, after, or simultaneously with the acid (aq.) for use in the stimulation process.

Likewise, when acidic treatment fluids in the form of multi-phase mixtures are utilized, the methods may involve preforming the acidic treatment fluids containing both the aqueous phase and the oil phase above well, then injecting the pre-formed acidic treatment fluid (e.g., emulsion) downhole for the acid stimulation operation. Alternatively, the methods may involve first injecting the oil phase (e.g., kerosene, diesel oil, crude oil, gas oil, fuel oil, paraffin oil, mineral oil, low toxicity mineral oil, other petroleum distillate, polyolefin, polydiorganosiloxane, siloxane, organosiloxane) downhole, followed by injecting the aqueous phase (acid (aq.), corrosion inhibitor, and any optional components) downhole, where the phases are combined downhole to form the multi-phase mixture for acid stimulation.

Injection may proceed through suitable injection lines to areas where acid stimulation treatment is desired or where corrosion can, or is likely to, occur through capillaries or umbilical lines (in many cases at the wellhead if suitable metallurgy is used downhole). Injection may be performed manually or it may be automatic, for example, by using chemical injection pumps. In some embodiments, the acidic treatment fluid may be stored in a chemical storage tank and a chemical injection pump associated therewith may be used to introduce the acidic treatment fluid into the desired location of the operation. In any of the above applications, the acidic treatment fluid or any of its components combinable downhole may be injected continuously and/or in batches. The chemical injection pump(s) can be automatically or manually controlled to inject any amount of the acidic treatment fluid needed for acidizing operations or any amount of the pyrazine corrosion inhibitor suitable for inhibiting corrosion.

The acidic treatment fluids may be in contact with many different types of surfaces on tubing and field equipment that are susceptible to corrosion. Illustrative examples of which include, but are not limited to, separation vessels, dehydration units, gas lines, pipelines, cooling water systems, valves, spools, fittings (e.g., such as those that make up the well Christmas tree), treating tanks, storage tanks, coils of heat exchangers, fractionating columns, cracking units, pump parts (e.g., parts of beam pumps), and in particular downhole surfaces that are most likely to come into contact with the acidic treatment fluids during stimulation operations, such as those casings, liners, pipes, bars, pump parts such as sucker rods, electrical submersible pumps, screens, valves, fittings, and the like.

Any metal surface that may come into contact with the acidic treatment fluid may be protected by the pyrazine corrosion inhibitor of the present disclosure. Typical metals found in oil and gas field environments that may be protected include carbon steels (e.g., mild steels, high-tensile steels, higher-carbon steels), including American Petroleum Institute (API) carbon steels; high alloy steels including chrome steels, ferritic alloy steels, austenitic stainless steels, precipitation-hardened stainless steels high nickel content steels; galvanized steel, aluminum, aluminum alloys, copper, copper nickel alloys, copper zinc alloys, brass, ferritic alloy steels, and any combination thereof. Specific examples of typical oil field tubular steels include X60, J-55, N-80, L-80, P:105, P110, and high alloy chrome steels such as Cr-9, Cr-13, Cr-2205, Cr-2250, and the like. In preferred embodiments, the methods herein inhibit corrosion of API X-60 carbon steel.

The pyrazine corrosion inhibitor performs surprisingly well to inhibit corrosion in highly acidic mediums and at temperatures even up to 180° C., for example at temperatures of 25 to 180° C., preferably 35 to 160° C., preferably 45 to 140° C., preferably 55 to 120° C., preferably 65 to 110° C., preferably 75 to 100° C., preferably 85 to 90° C. In preferred embodiments, the oil and gas well is treated with the acidic treatment fluid at a temperature of 50 to 70° C., preferably 55 to 65° C., preferably 60° C. In other preferred embodiments, the oil and gas well is treated with the acidic treatment fluid at a temperature of 80 to 100° C., preferably 85 to 95° C., preferably 90° C.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight of the metal during reference time), area (initial surface area of the metal), time (length of exposure time) and density of the metal. Corrosion rate may be measured according to the American Society for Testing and Materials (ASTM) standard weight loss (immersion) test (e.g., according to ASTM G31-72 and described in the Examples), and may be computed using mils penetration per year (mpy).

In some embodiments, the method provides a corrosion rate of 50 to 120 mpy, preferably 55 to 105 mpy, preferably 60 to 90 mpy, preferably 65 to 85 mpy, preferably 70 to 80 mpy, when the oil and gas well is treated with the acidic treatment fluid containing 15 wt. % of the acid at 25° C.

In some embodiments, the method provides a corrosion rate of 400 to 840 mpy, preferably 405 to 820 mpy, preferably 410 to 800 mpy, preferably 450 to 700 mpy, preferably 500 to 600 mpy, when the oil and gas well is treated with the acidic treatment fluid containing 15 wt. % of the acid and 2,3-pyrazine dicarboxylic acid at 60° C. In some embodiments, the method provides a corrosion rate of 650 to 800 mpy, preferably 680 to 780 mpy, preferably 690 to 760 mpy, preferably 700 to 740 mpy, preferably 710 to 720 mpy, when the oil and gas well is treated with the acidic treatment fluid containing 15 wt. % of the acid and pyrazine-2-carboxamide at 60° C. In some embodiments, the method provides a corrosion rate of 760 to 3,000 mpy, preferably 800 to 2,700 mpy, preferably 900 to 2,500 mpy, preferably 1,000 to 2,100 mpy, preferably 1,100 to 1,800 mpy, when the oil and gas well is treated with the acidic treatment fluid containing 15 wt. % of the acid and 2-methoxy-3-(1-methylpropyl) pyrazine at 60° C.

In some embodiments, the method provides a corrosion rate of 1,500 to 3,000 mpy, preferably 1,600 to 2,900 mpy, preferably 1,700 to 2,800 mpy, preferably 2,000 to 2,700 mpy, preferably 2,400 to 2,600 mpy, when the oil and gas well is treated with the acidic treatment fluid containing 15 wt. % of the acid and 2,3-pyrazine dicarboxylic acid at 90° C. In some embodiments, the method provides a corrosion rate of 1,600 to 9,000 mpy, preferably 1,700 to 8,000 mpy, preferably 1,800 to 7,000 mpy, preferably 2,000 to 6,000 mpy, preferably 2,500 to 5,000 mpy when the oil and gas well is treated with the acidic treatment fluid containing 15 wt. % of the acid and pyrazine-2-carboxamide at 90° C. In some embodiments, the method provides a corrosion rate of 5,000 to 10,000 mpy, preferably 5,500 to 9,500 mpy, preferably 6,000 to 9,000 mpy, preferably 6,500 to 8,500 mpy, preferably 7,000 to 8,000 mpy, when the oil and gas well is treated with the acidic treatment fluid containing 15 wt. % of the acid and 2-methoxy-3-(1-methylpropyl) pyrazine at 90° C.

Corrosion inhibition efficiencies (IE %) may be measured by comparing the corrosion rates obtained from acidic treatment fluids with and without corrosion inhibitors using weight loss (immersion) studies, electrochemical impedance spectroscopy (EIS), potentiodynamic polarization (PDP), Linear polarization resistance (LPR) or other similar methods. In some embodiments, the method described herein achieves a corrosion inhibition efficiency of 40 to 65%, preferably 42 to 62%, preferably 44 to 60%, preferably 46 to 58%, preferably 48 to 56%, preferably 50 to 54% when the oil and gas well is treated with the acidic treatment fluid at 25° C. In some embodiments, the method described herein achieves a corrosion inhibition efficiency of 70 to 90%, preferably 72 to 88%, preferably 74 to 86%, preferably 76 to 84%, preferably 78 to 82%, preferably 80 to 81% when the oil and gas well is treated with the acidic treatment fluid at 60° C. In some embodiments, the method described herein achieves a corrosion inhibition efficiency of 66 to 90%, preferably 68 to 88%, preferably 70 to 86%, preferably 72 to 84%, preferably 74 to 82%, preferably 76 to 80% when the oil and gas well is treated with the acidic treatment fluid at 90° C.

Of course, the methods herein do not preclude introduction of other known chemical treatments into oil and gas field production and downstream transportation, distribution, and/or refining systems, and thus the acidic treatment fluids may be used in conjunction with other chemical treatments known to those of ordinary skill in the art, including, but not limited to, hydrate inhibitors, scale inhibitors, asphaltene inhibitors, paraffin inhibitors, $H_2S$ scavengers, $O_2$ scavengers, emulsion breakers, foamers and de-foamers, and water clarifiers.

The examples below are intended to further illustrate protocols for preparing and testing the acidic treatment fluids and are not intended to limit the scope of the claims.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

EXAMPLES

Experimental

Materials

API X60 steel from a typical pipeline was utilized as coupons to carry out this study. Chemical compositions of the specimen utilized are illustrated in Table 1. The coupons were cut to the dimension 3×3 cm. Several emery papers ranging from grit sizes of 120, 240, 320, 400, 600 to 800 were employed in grinding the coupons. The coupons were thoroughly rinsed in distilled water after which they were sonicated in acetone. The coupons were finally dried in air prior to immersion. Analytical grade HCl with percentage purity of 37% (Sigma Aldrich) was diluted to 15% HCl acid using distilled water.

TABLE 1

Chemical composition of the X60 steel specimen used for the experiment.

| | Element | | | | | | | | | | |
|---|---|---|---|---|---|---|---|---|---|---|---|
| | Fe | Cr | C | Si | Mn | Cu | Ni | Mo | Al | Nb | V |
| Composition (wt. %) | <96.2 | 0.121 | 0.125 | 0.52 | 1.830 | 0.296 | 0.091 | 0.079 | 0.043 | 0.053 | 0.078 |

Electrochemical Measurement

The setup employed for the electrochemical techniques consist of counter electrode (graphite), reference electrode (Ag/AgCl), and working electrode (X60 steel). The readings were taken on Gamry Potentiostat/Galvanostat/ZRA (Reference 3000) instrument. EIS, LPR, PDP, and EFM, were utilized to investigate corrosion performance of X60 steel in the presence and absence of 2000 ppm concentrations of the three pyrazine derivatives in 15% HCl. EIS readings were taken within 100 kHz-0.01 Hz frequency range and 10 mV amplitude after 3600 s delay for stability to be achieved. PDP measurements were taken between the potential of 0.25 V vs. $E_{OC}$ and a scan rate of 0.125 mV/s. LPR readings were taken at $E_{corr} \pm 10$ mV and 0.125 mV/s scan rate. EFM was conducted with a base frequency of 0.01, multiplier A=2, B=5, cycle=4 and amplitude=10 mV. Data analysis and curve fittings were performed utilizing Gamry EChem Analyst 5.5 software.

Weight Loss

Weight loss tests were carried out on X60 steel coupons in 15% HCl with various concentrations of 2,3-pyrazine dicarboxylic acid (pyrazine C), pyrazine-2-carboxamide (pyrazine E), and 2-methoxy-3-(1-methylpropyl) pyrazine (pyrazine H), for 6 hours at 60 and 90° C. During weight loss measurements, each specimen was weighed prior to immersion. The coupons were immersed in duplicates. After completion, coupons were retrieved, immersed in 1 M acid solution for 15 s to remove corrosion products, thoroughly washed, cleaned, air dried, and reweighed. The corrosion rates were calculated in mils per year (mpy) using equation 1:

$$\text{Corrosion rate } (mpy) = \frac{3.45 \times 10^6 \times W}{D \times A \times T} \quad (1)$$

where, W is weight loss (g), A is surface area exposed (cm$^2$), T is exposure time (hrs), and D is density (7.86 g/cm$^3$).

Inhibition efficiency was evaluated from equation 2:

$$\% IE = \frac{CR_o - CR_i}{CR_o} \times 100 \quad (2)$$

where $CR_O$ is corrosion rate of steel in blank and CR; is corrosion rate with inhibitor.

Computational Modeling

Marvin-Beans software was used to model the behavior of the three pyrazine derivatives in strong acidic pH aqueous solutions utilizing a semi-empirical computational technique.

Surface Analysis

FTIR

FTIR analysis of the pure inhibitor and that of the corrosion product was performed using Shimadzu FTIR-8400S spectrophotometer. Analyses of the samples were performed at 400-4000 cm$^{-1}$ wave number range. FTIR spectra of pure inhibitor and scrapped corrosion products on the steel coupon after immersion in pyrazine C, E, and H in 15% HCl solutions were obtained and analyzed.

SEM/EDX

Surface morphological features were performed on the coupons after immersion in 15% acid and with various pyrazine concentrations at 6 h at 25° C. using Scanning Electron Microscopy (JOEL JSM-6610LV) operated at accelerating voltage of 20 kV. The associated EDX was used to provide qualitative information about surface elemental composition.

Results and Discussions

Electrochemical Measurement

Electrochemical Impedance Spectroscopy Studies

Figure 1B:
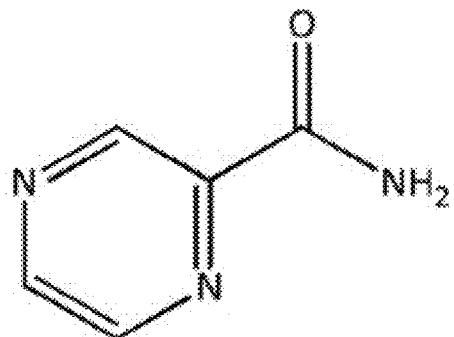
Figure 1C:
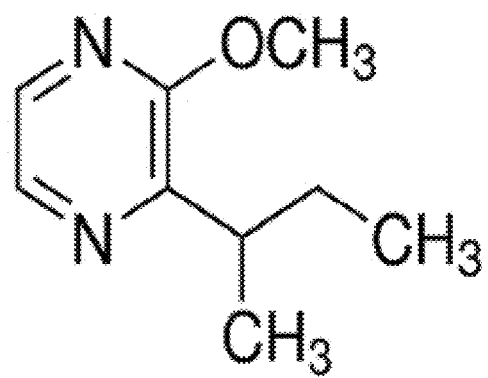
Figure 2A:
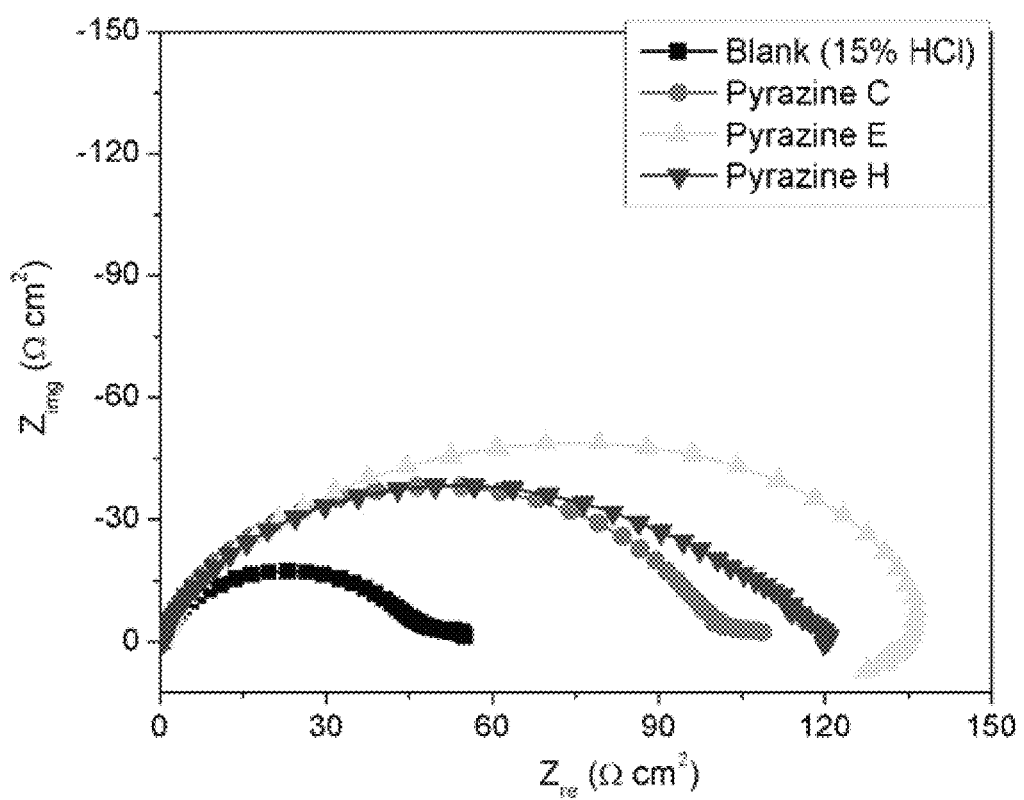
FIGS. 2A-2C are graphs illustrating the impedance plots for X60 steel in 15% HCl without and with 0.2% wt. of different types of pyrazine derivatives at 25° C. in (A) Nyquist (B) Bode modulus and (C) Phase angle representations.
Figure 2B:
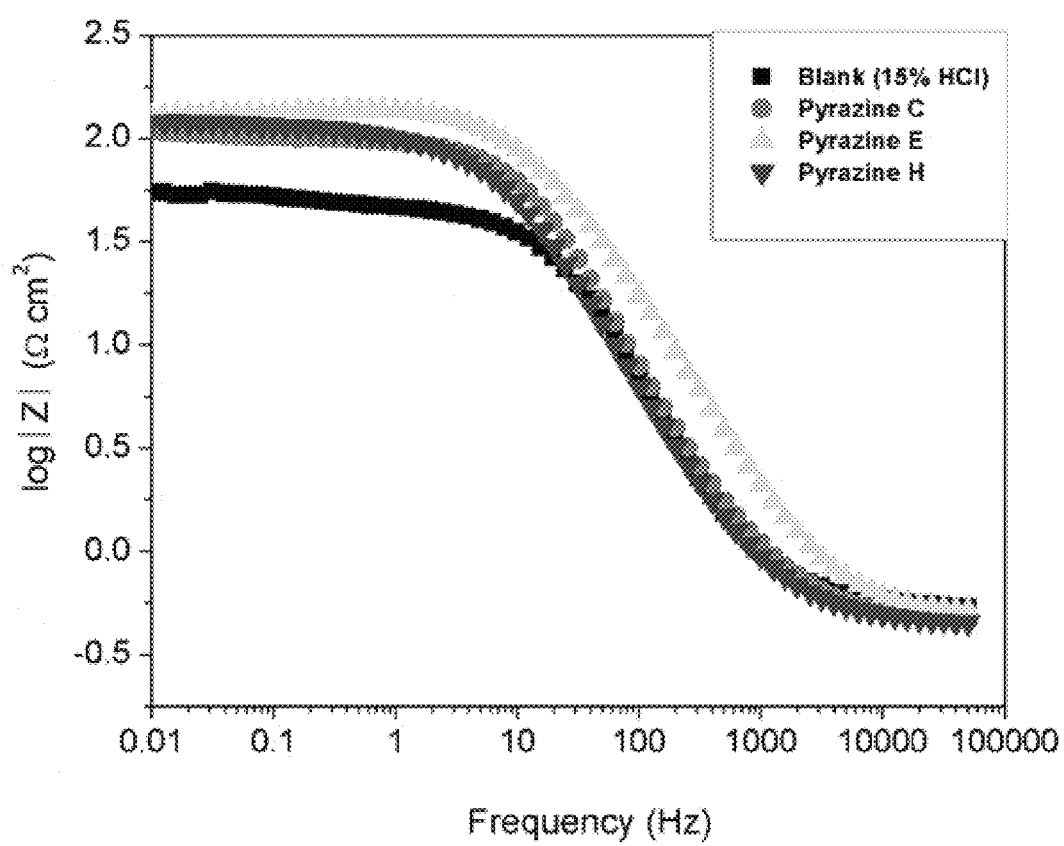
Figure 2C:
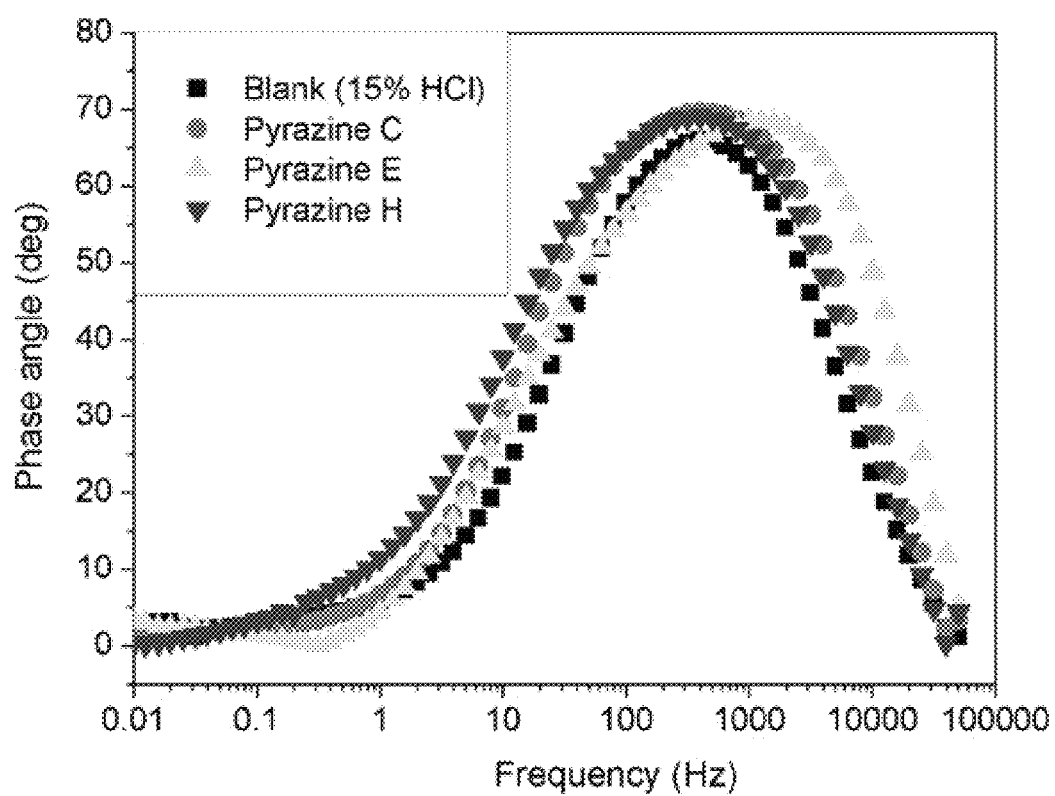
Figure 3:
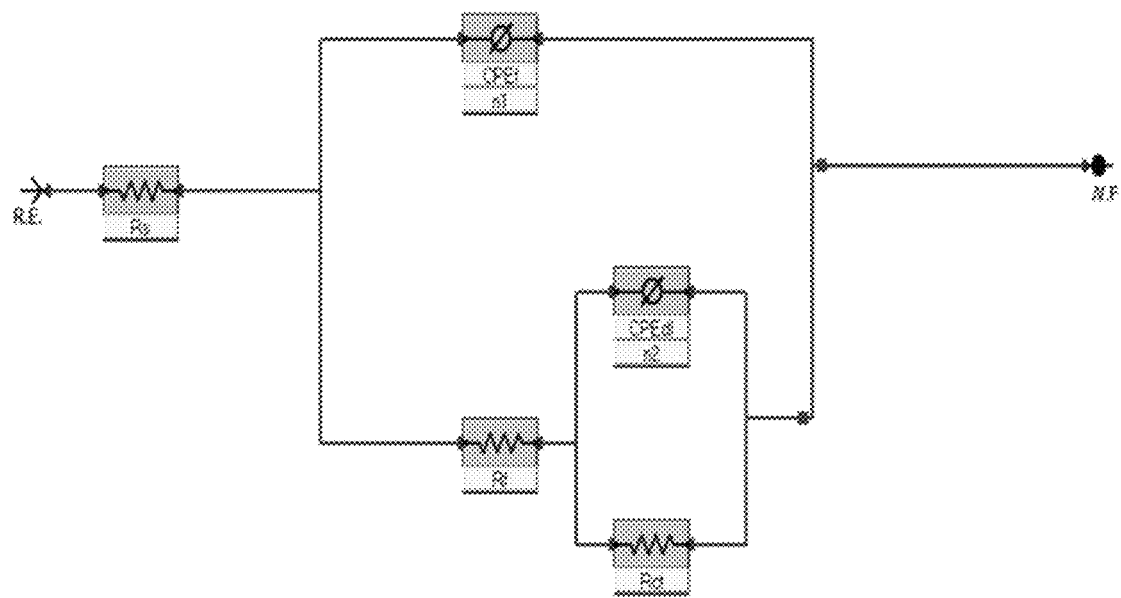
FIG. 3 illustrates the equivalent circuit utilized to fit the EIS data.

FIGS. 2A-2C illustrate Nyquist, Bode and phase impedance plots, respectively, in 15% HCl with 0.2% wt/vol. of three different pyrazine derivatives at 25° C. The Nyquist plot shows semicircular arc over the entire frequency range and was attributed to the occurrence of charge transfer in the solution. See M. Prabakaran, S. H. Kim, V. Hemapriya, I. M. Chung, Tragia plukenetii extract as an eco-friendly inhibitor for mild steel corrosion in HCl 1 M acidic medium, Res. Chem. Intermed. 42 (2016) 3703-3719—incorporated herein by reference in its entirety. The imperfect semicircular nature could be caused by the presence of surface inhomogeneities. The increase in the radius of the capacitive arc with the addition of the pyrazines is a clear indication of inhibition. The bigger the radius the more effective the inhibition process. As illustrated in FIGS. 1A-1C, pyrazine E (FIG. 1B) possesses an extra N atom in the structure in comparison to pyrazine C (FIG. 1A) and pyrazine H (FIG. 1C) leading to increased rate of interaction between the N-atoms and the active sites of the metal resulting in adsorption. This suggest coordination bond formation of Fe with N atoms. Adsorption on the metal surface may also be enhanced by N atoms by donating pi electrons to the metal surface. See C. Verma, L. O. Olasunkanmi, E. E. Ebenso, M. A. Quraishi, I. B. Obot, Adsorption Behavior of Glucosamine-Based, Pyrimidine-Fused Heterocycles as Green Corrosion Inhibitors for Mild Steel: Experimental and Theoretical Studies, J. Phys. Chem. C. 120 (2016) 11598-11611—incorporated herein by reference in its entirety. These interactions of nitrogen atoms with the surface of the steel led to an increased resistance to charge transfer and hence increased capacitive arc as presented in FIG. 2A. Differences in radii of capacitive arcs of the Nyquist plot demonstrate that the addition of the pyrazine derivatives impeded corrosion by inhibition. The larger the radius of the arc, the higher the efficiency. Double layer and film capacitances observed showed that charge transfer processes controlled the corrosion mechanism. See Y. Hao, L. A. Sani, T. Ge, Q. Fang, The synergistic inhibition behaviour of tannic acid and iodide ions on mild steel in H$_2$SO$_4$ solutions, Corros. Sci. 123 (2017) 158-169; H. Gao, Q. Li, Y. Dai, F. Luo, H. X. Zhang, High efficiency corrosion inhibitor 8-hydroxyquinoline and its synergistic effect with sodiumdodecylbenzenesulphonate on AZ91D magnesium alloy, Corros. Sci. 52 (2010) 1603-1609; and W. Liu, A. Singh, Y. Lin, E. E. Ebenso, L. Zhou, B. Huang, 8-Hydroxyquinoline as an Effective Corrosion Inhibitor for 7075 Aluminium Alloy in 3.5% NaCl Solution Wanying, Corros. Sci. 52 (2010) 1603-1609—each incorporated herein by reference in their entirety. EIS data extracted from Nyquist plot are shown in Table 2. The equivalent circuit employed in fitting the Nyquist plot is illustrated in FIG. 3. The accuracy of the fit was between 7.1-28.2×10$^{-4}$ for all plots. The model utilized includes Rs (resistance of the solution between counter and working electrodes), Rf (film resistance), Rct (charge transfer resistance), CPE$_f$ (constant phase element of film) and CPE$_{dl}$ (double layer constant phase element). Inhibitor efficiency was evaluated from equation 3:

$$IE\ (EIS)\ \% = \left(1 - \frac{R_P}{R_{PI}}\right) \times 100 \quad (3)$$

where Rp [sum of $R_{ct}$ and $R_f$] and $R_{PI}$ represent polarization resistances without and with pyrazine, respectively.

TABLE 2

Impedance parameters for X60 steel in 15% HCl without and with 0.2% wt. of different pyrazine derivatives at 25° C.

| Systems | $R_s$ ($\Omega$ cm$^2$) | CPE$_f$ | | $R_f$ ($\Omega$ cm$^2$) | CPE$_{dl}$ | | $R_{ct}$ ($\Omega$ cm$^2$) | $R_p$ ($\Omega$ cm$^2$) | $\chi^2 \times 10^{-4}$ | IE(%) |
| --- | --- | --- | --- | --- | --- | --- | --- | --- | --- | --- |
| | | $Y_o$ ($\mu\Omega s^n$ cm$^{-2}$) | n | | $Y_o$ ($\mu\Omega s^n$ cm$^{-2}$) | n | | | | |
| Blank | 0.53 | 196.0 | 0.89 | −36.90 | 1170.0 | 0.18 | 96.9 | 60.0 | 7.1 | — |
| Pyrazine C | 0.51 | 3.7 | 1.1 | 0.70 | 300.5 | 0.78 | 102.2 | 102.9 | 11.5 | 41.7 |
| Pyrazine E | 0.49 | 118.2 | 0.91 | 17.4 | 154.7 | 0.89 | 115.5 | 132.9 | 28.2 | 54.9 |
| Pyrazine H | 0.48 | 19.4 | 1.1 | 1.05 | 541.2 | 0.97 | 116.3 | 117.4 | 13.3 | 48.9 |

CPE was used to accurately fit the curve instead of pure capacitor. See A. Y. Adesina, Z. M. Gasem, A. Madhan Kumar, Corrosion Resistance Behavior of Single-Layer Cathodic Arc PVD Nitride-Base Coatings in 1M HCl and 3.5 pct NaCl Solutions, Metall. Mater. Trans. B. 48 (2017) 1-12; and A. K. Singh, E. E. Ebenso, M. A. Quraishi, Corrosion inhibition behavior of cefuzonam at mild steel/HCl acid interface, Res. Chem. Intermed. 39 (2013) 3033-3042—each incorporated herein by reference in their entirety. The impedance of CPE was evaluated as:

$$Z_{CPE} = Y_o^{-1}(j\omega)^{-n} \tag{4}$$

where $Y_o$ is the magnitude of CPE, j is square root of −1, $\omega$ is angular frequency and n is phase shift. See M. Larif, A. Elmidaoui, A. Zarrouk, H. Zarrok, R. Salghi, B. Hammouti, H. Oudda, F. Bentiss, An investigation of carbon steel corrosion inhibition in hydrochloric acid medium by an environmentally friendly green inhibitor, Res. Chem. Intermed. 39 (2013) 2663-2677—incorporated herein by reference in its entirety. Capacitance of the double layer (CPE)$_{dl}$ values were evaluated from equation 5:

$$CPE_{dl} = \frac{Y\omega^{n-1}}{\sin\left(n\left(\frac{\pi}{2}\right)\right)} \tag{5}$$

As presented in Table 2, charge transfer resistance increased significantly when inhibitor was added and was attributed to formation of surface film. The surface film protects by isolating the steel surface from corroding media thereby impeding further charge and mass transfer.

Potentiodynamic Polarization Measurements

Figure 4:
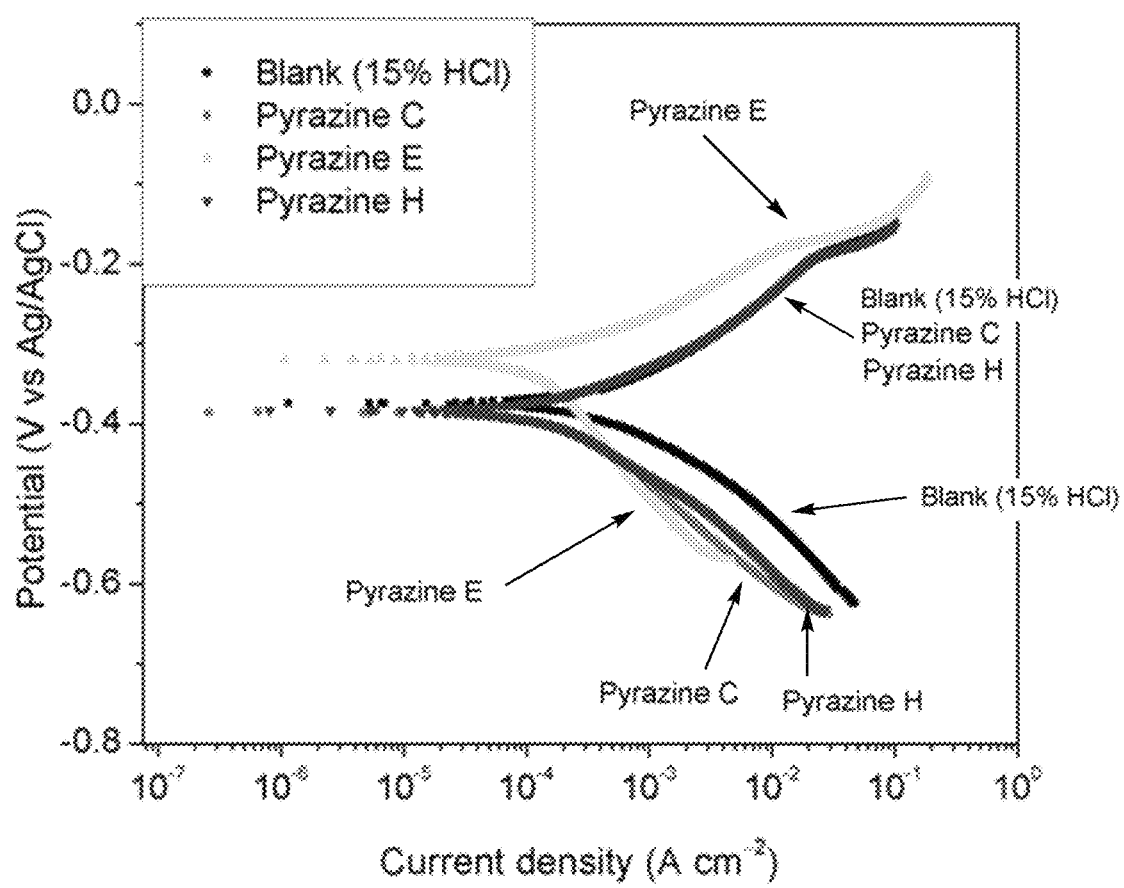
FIG. 4 is a graph illustrating the potentiodynamic polarization plots for X60 steel in 15% HCl without and with 0.2% wt. of different types of pyrazine derivatives at 25° C.
Figure 5A:
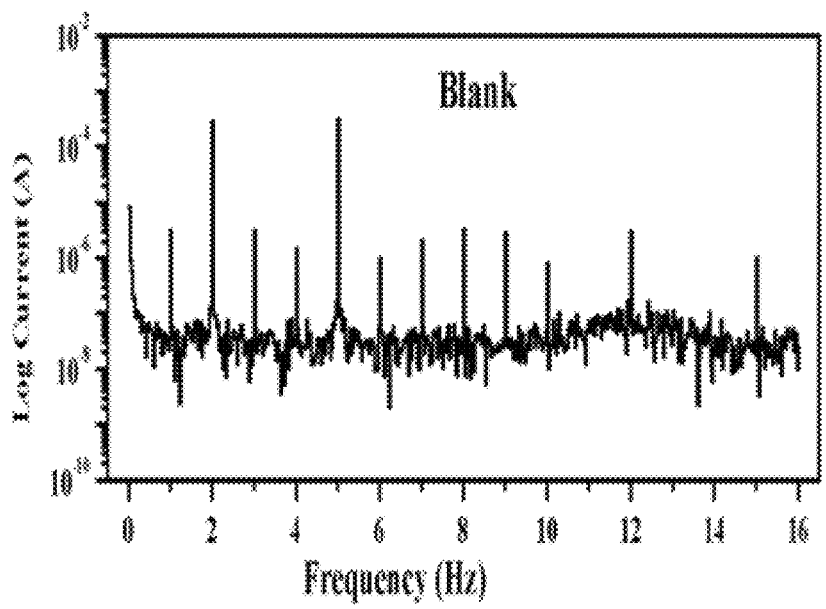
FIGS. 5A-5D are graphs illustrating the intermodulation frequency plots for X60 steel in 15% HCl without and with 0.2% wt. of different types of pyrazine derivatives at 25° C.
Figure 5B:
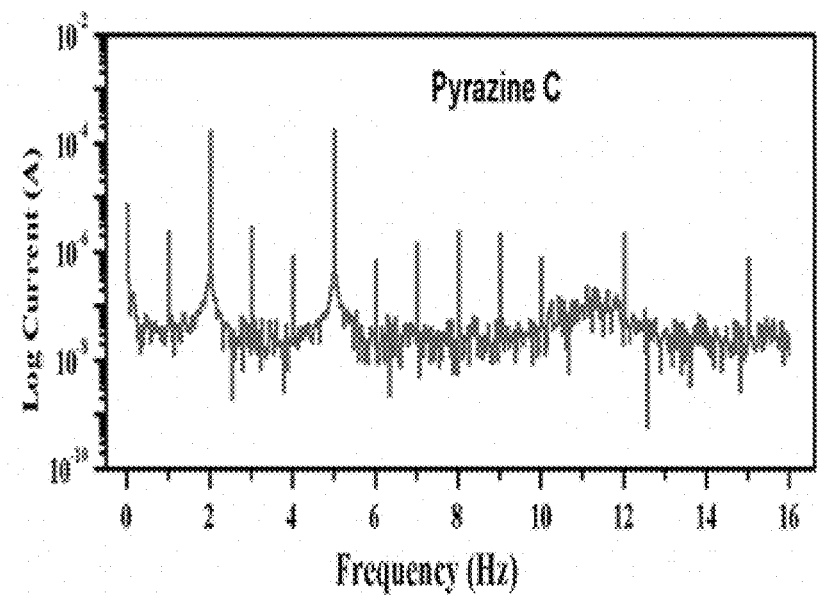
Figure 5C:
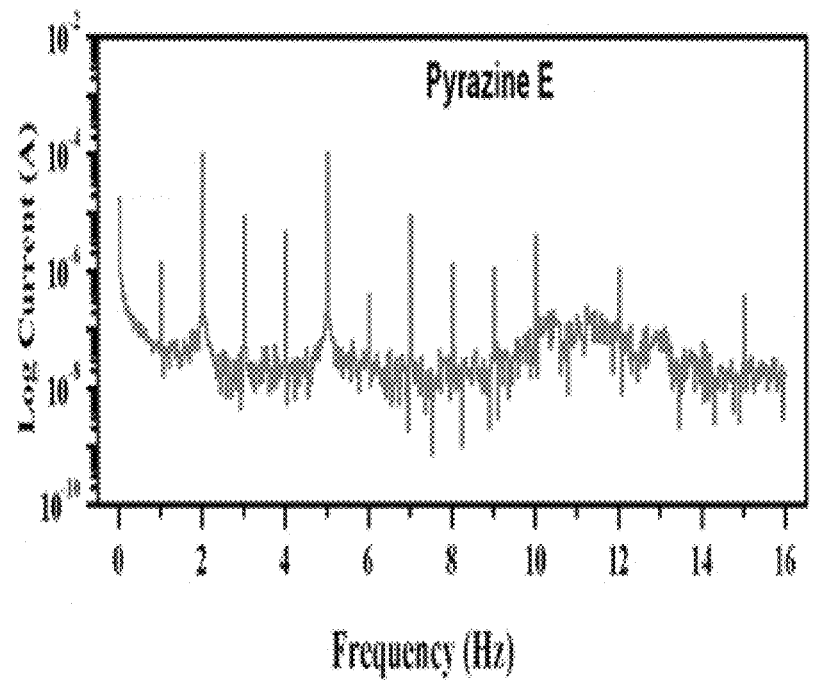
Figure 5D:
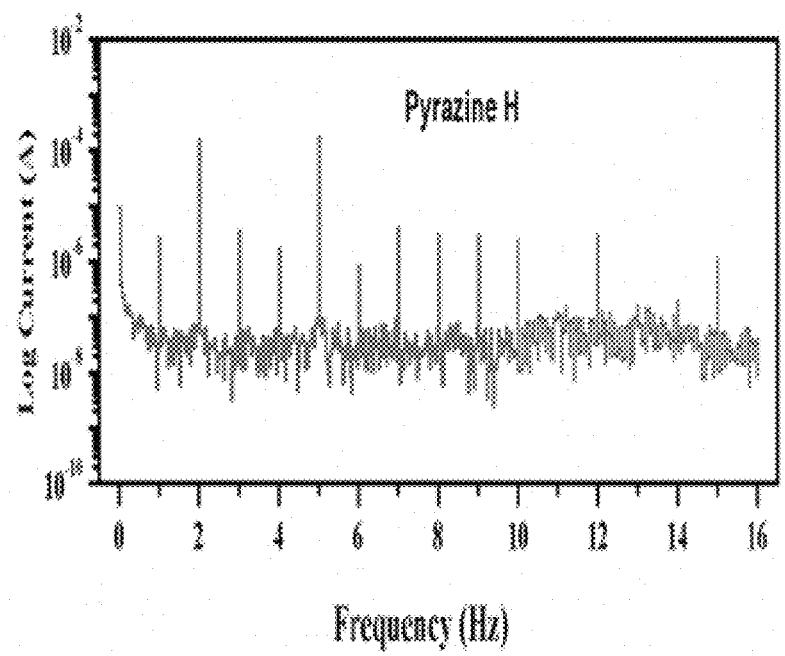

Polarization curves for X60 with and without the three pyrazine derivatives are presented in FIG. 4. Tafel extrapolation was employed to acquire the respective electrochemical parameter. These parameters are presented in Table 3. Inhibitor efficiency was evaluated from corrosion current densities utilizing equation 6:

$$IE(PDP) \% = \left(1 - \frac{I_{corr}^I}{I_{corr}^B}\right) \times 100 \tag{6}$$

where $I^B_{corr}$ is corrosion current density in blank and $I^I_{corr}$ is corrosion current density with an inhibitor present. The data in Table 3, showed that, $I_{corr}$ decreased upon the addition of the three pyrazine derivatives. Pyrazine E exhibited the least $I_{corr}$ and hence higher efficiency. Addition of pyrazine C and H shifts the cathodic Tafel slopes to more cathodic region while the anodic portion and the $E_{corr}$ remains constant as illustrated in FIG. 4. This is a clear indication that pyrazine C and H are mixed typed inhibitors but predominantly cathodic. Addition of pyrazine E on the other hand caused a significant shift in the Ecorr, cathodic and anodic curves as shown in FIG. 4. The behavior of pyrazine E is a clear indication of mixed type inhibitor. Thus the pyrazine derivatives studied in this work do not only interfere with dissolution of the metal but also interfere with hydrogen evolution as well. See A. Gülşen, Corrosion inhibition of mild steel by *Laurus nobilis* leaves extract as green inhibitor, Res. Chem. Intermed. 38 (2012) 1311-1321—incorporated herein by reference in its entirety. The observed decrease in corrosion current densities, $I_{corr}$, with the addition of pyrazine derivatives in Table 3, indicates increased protection of X60 steel surface.

TABLE 3

Potentiodynamic polarization (PDP) and Linear polarization resistance (LPR) parameters for X60 steel in 15% HCl without and with 0.2% wt. of different pyrazine derivatives at 25° C.

| | PDP Method | | | | | | LPR Method | | |
| --- | --- | --- | --- | --- | --- | --- | --- | --- | --- |
| Systems | $E_{corr}$ (mV vs Ag/AgCl) | $I_{corr}$ (A/cm$^2$) | $\beta_a$ (mV/dec) | $\beta_c$ (mV/dec) | $C_R$ (mpy) | IE (%) | $R_p$ ($\Omega$/cm$^2$) | $C_R$ (mpy) | IE (%) |
| Blank | −374 | 357 | 82.6 | 90.5 | 163.1 | — | 57.9 | 205.5 | — |
| Pyrazine C | −386 | 181 | 72.6 | 120.7 | 82.8 | 49.3 | 115.4 | 103.1 | 49.8 |
| Pyrazine E | −320 | 136 | 57.0 | 207.1 | 61.9 | 61.9 | 138.6 | 85.9 | 58.2 |
| Pyrazine H | −383 | 166 | 67.2 | 108.3 | 76.1 | 53.5 | 118.7 | 100.3 | 51.2 |

Linear Polarization Resistance Measurement

Linear polarization resistance measurement was performed to evaluate efficiency of inhibition by the three pyrazine derivatives in 15% HCl. This technique allows corrosion rate to be measured in real time and the technique is nondestructive. A small voltage value of 10 mV was chosen to avoid permanently disrupting the corrosion process, such that ensuing measurement remains accurate. The linear relationship between E/I and $I_{corr}$ are valid at this small voltage value. See S. G. Millard, D. Law, J. H. Bungey, J. Cairns, Environmental influences on linear polarisation corrosion rate measurement in reinforced concrete, NDT E Int. 34 (2001) 409-417; and L. O. Olasunkanmi, I. B. Obot, M. M. Kabanda, E. E. Ebenso, Some Quinoxalin-6-yl Derivatives as Corrosion Inhibitors for Mild Steel in Hydrochloric Acid: Experimental and Theoretical Studies, J. Phys. Chem. C. 119 (2015) 16004-16019—each incorporated herein by reference in their entirety. Polarization resistance (Rp) and efficiency values obtained are illustrated in Table 3. Efficiency of inhibition was evaluated utilizing equation 7 (See S. A. Umoren, Polypropylene glycol: A novel corrosion inhibitor for ×60 pipeline steel in 15% HCl solution, J. Mol. Liq. 219 (2016) 946-958—incorporated herein by reference in its entirety):

$$IE\ (LPR)\% = \left(1 - \frac{R_p^B}{R_p^I}\right) \times 100 \qquad (7)$$

where $R^B_p$ is the polarization resistance with no inhibitor present and $R^I_p$ is polarization resistance with an inhibitor present. The values presented in Table 3 indicate an increase in the polarization resistance with the addition of the inhibitors relative to the uninhibited acid. This behavior corroborates the fact that the addition of the three pyrazine derivatives inhibits corrosion of steel in this high acidic environment. Addition of pyrazine E increased polarization resistance value to 138.6 $\Omega cm^{-2}$ in contrast to 57.9 $\Omega cm^{-2}$ obtained in the uninhibited acid. This indicates a clear inhibition of the corroding steel in the aggressive 15% HCl. It is apparent that PDP and LPR values are in perfect agreement. Both show similar trends in decreased corrosion rates and increased inhibition efficiencies with the addition of pyrazine derivatives.

Electrochemical Frequency Modulation

FIGS. 5A-5D presents intermodulation spectra for X60 steel with and without the three pyrazine derivatives in 15% HCl at 25° C. EFM is a type of nondestructive method that gives corrosion current directly. Sine waves with two frequencies that are different are simultaneously used in the cell. See S. S. Abdel-Rehim, K. F. Khaled, N. S. Abd-Elshafi, Electrochemical frequency modulation as a new technique for monitoring corrosion inhibition of iron in acid media by new thiourea derivative, Electrochim. Acta. 51 (2006) 3269-3277; R. W. Bosch, W. F. Bogaerts, Instantaneous Corrosion Rate Measurement with Small-Amplitude Potential Intermodulation Techniques, Corros. 52 (1996) 204-211; K. F. Khaled, Application of electrochemical frequency modulation for monitoring corrosion and corrosion inhibition of iron by some indole derivatives in molar hydrochloric acid, Mater. Chem. Phys. 112 (2008) 290-300—each incorporated herein by reference in their entirety. The response of the current consists of frequencies that are multiples, differences, and sums of the two-frequency inputs. The two-frequency inputs were very small and were multiples of a base frequency. The higher frequency is usually more than the lowest by a factor of two at least. Response of the current between peaks is quite small. Table 4 illustrates the parameters obtained for the various pyrazines. Corrosion current density decreased when the pyrazines were added indicating inhibition in the 15% HCl. This observation was further authenticated by approximately equal values of the experimental CF values with the theoretical values of 2 and 3. Inhibitor efficiency ($IE_{(EFM)}\%$) presented in Table 4 was evaluated utilizing equation 8:

$$\%\ IE_{(EFM)} = \left(1 - \frac{I_{corr}^I}{I_{corr}^B}\right) \times 100 \qquad (8)$$

where $I^B_{corr}$ and $I^I_{corr}$ are corrosion current densities without and with an inhibitor, respectively.

TABLE 4

Electrochemical frequency modulation parameters for X60 steel in 15% HCl in the absence and presence of 0.2% wt. of different pyrazine derivatives at 25° C.

| Systems | $I_{corr}$ (μA cm$^{-2}$) | $\beta_a$ (mV dec$^{-1}$) | $\beta_c$ (mV dec$^{-1}$) | CF-2 | CF-3 | IE (%) |
|---|---|---|---|---|---|---|
| Blank | 513.8 | 110.3 | 117.2 | 2.32 | 3.05 | — |
| Pyrazine C | 245.2 | 95.2 | 103.0 | 2.59 | 3.12 | 52.3 |
| Pyrazine E | 181.2 | 91.1 | 172.9 | 1.97 | 3.14 | 64.7 |
| Pyrazine H | 214.1 | 81.9 | 92.7 | 1.79 | 3.02 | 58.3 |

Weight Loss

The initial assessment of the three pyrazine derivatives at 0.2% wt. concentration in 15% HCl at 25° C. was conducted using electrochemical techniques. Weight loss measurements were subsequently adopted to investigate the effect of varying concentration and temperature on the inhibition potential of the pyrazine derivatives. Corrosion rates and inhibitor efficiencies in an acidizing environment (15% HCl) with different inhibitor concentrations of three pyrazine derivatives was measured with weight loss technique. The weight loss results as presented in Tables 5, 6 and 7, indicate that all the derivatives of pyrazine studied in this work are good corrosion inhibitors especially with increase in temperature. See I. B. Obot, Z. M. Gasem, Theoretical evaluation of corrosion inhibition performance of some pyrazine derivatives, Corros. Sci. 83 (2014) 359-366—incorporated herein by reference in its entirety. Inhibition efficiency followed the order: pyrazine E>pyrazine C>pyrazine H at both 60° C. and at 90° C. investigated.

Effect of Concentration

The corrosion rates and inhibitor efficiencies are presented in Tables 5, 6 and 7 for pyrazine C, E and H, respectively. It is evident that, the corrosion rate significantly decreased upon adding the inhibitors. Considering pyrazine C, the corrosion rate significantly decreased from 3310 mpy to 839 mpy when 0.2 wt. % of the inhibitor was added. At 60° C., inhibition efficiency was relatively constant even though the concentration of pyrazine C was increase. This behavior could be attributed to the attainment of equilibrium in the rate of adsorption-desorption of pyrazine C molecules on the metal surface. As the temperature increased from 60° C. to 90° C., it was observed that, the corrosion rate in the blank solution was as high as 16870 mpy. This high corrosion rate in the blank was however drastically reduced to 2990 mpy when 0.2% wt. of pyrazine C was added. The corrosion rate further decreased to 2600 mpy when the inhibitor concentration was increased to 1 wt. %. As illustrated in FIGS. 6A-6B and FIGS. 7A-7B, it can be seen that the efficiency of pyrazine C was unchanged with concentration at both temperatures. At 60° C., the highest efficiency observed was 75.30% and this significantly increased to 84.15% when the temperature was increased to 90° C. This can be attributed to stronger adsorption of the pyrazine C molecules on the metal surface.

Figure 6B:
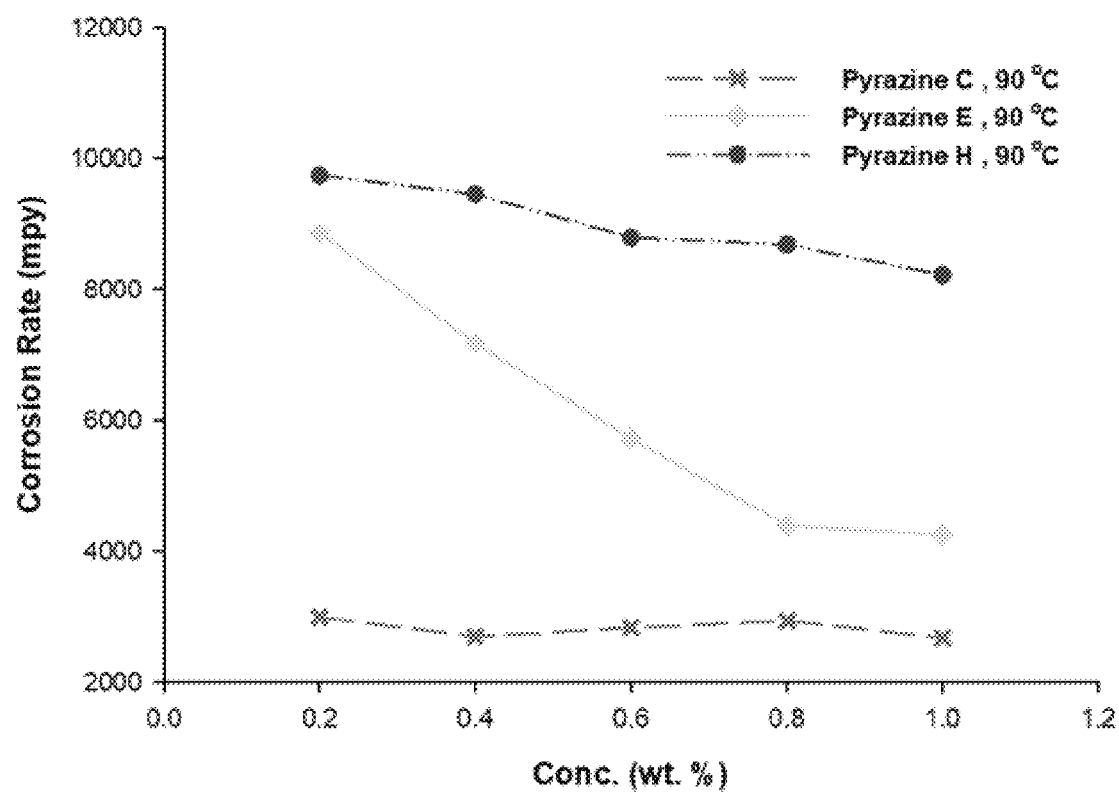
Figure 7A:
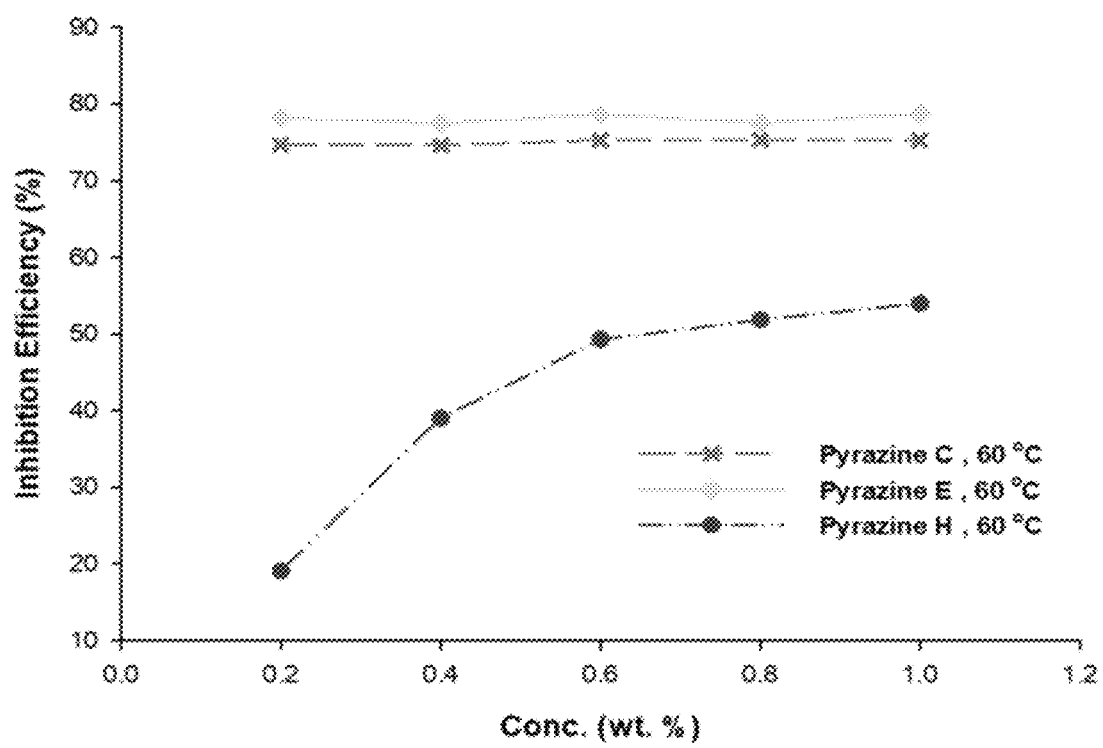
FIGS. 7A-7B are graphs illustrating the variation of corrosion inhibition efficiency (IE %) with pyrazine C, pyrazine E, and pyrazine H concentration in 15% HCl at (A) 60° C. (B) 90° C.
Figure 7B:
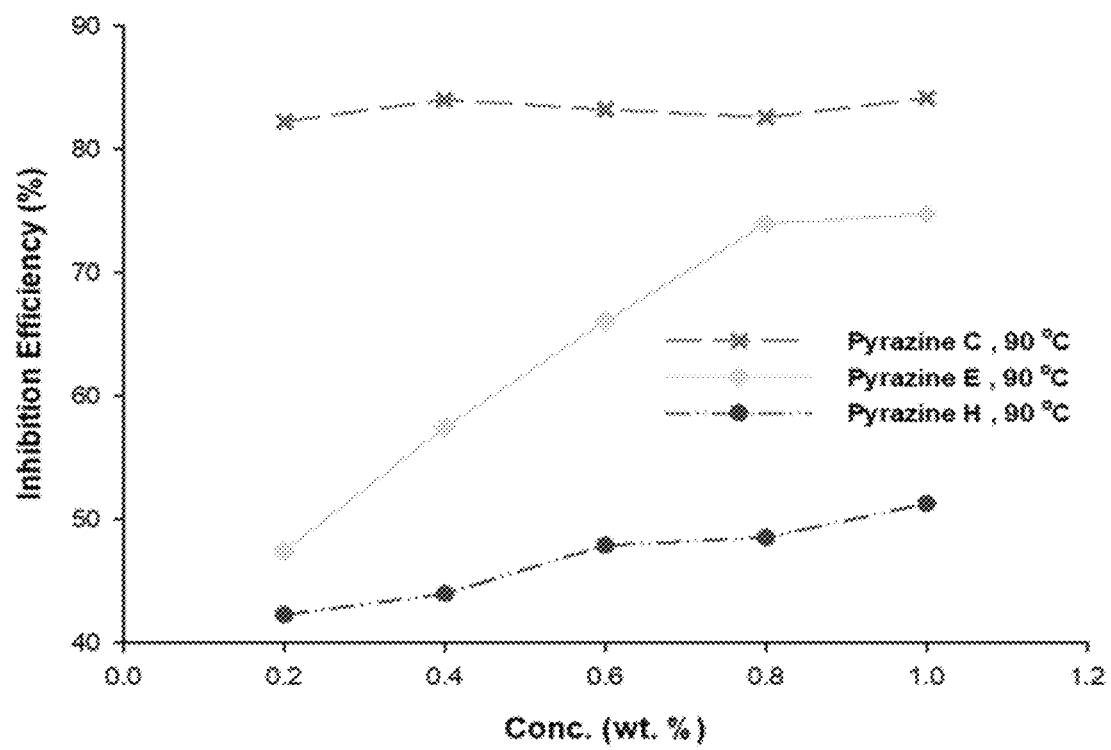

Considering pyrazine E, as illustrated in Table 6, the corrosion rate decreased significantly to 721.55 mpy when 0.2 wt % of pyrazine E was added at a temperature of 60° C. Increasing the inhibitor concentration causes no further change in the corrosion rate and the efficiency remains reasonably constant. This behavior was attributed to the attainment of equilibrium in the adsorption-desorption rate of the pyrazine E molecules on the metal surface. It is worth noting that at 90° C., the inhibition efficiency decreased to 47% when 0.2% wt. of the inhibitor was added and this subsequently increased with the inhibitor concentration to an efficiency of 74.78%. This indicates that as the temperature is increased, the effect of concentration becomes significant. As presented in FIG. 6B, the corrosion rate steadily decreased when 0.2% wt. of the inhibitor was added while FIG. 7B showed a steady increase in the inhibition efficiency with concentration at 90° C. This behavior could be attributed to both physisorption and chemisorption processes of corrosion inhibitor adsorption.

Figure 6A:
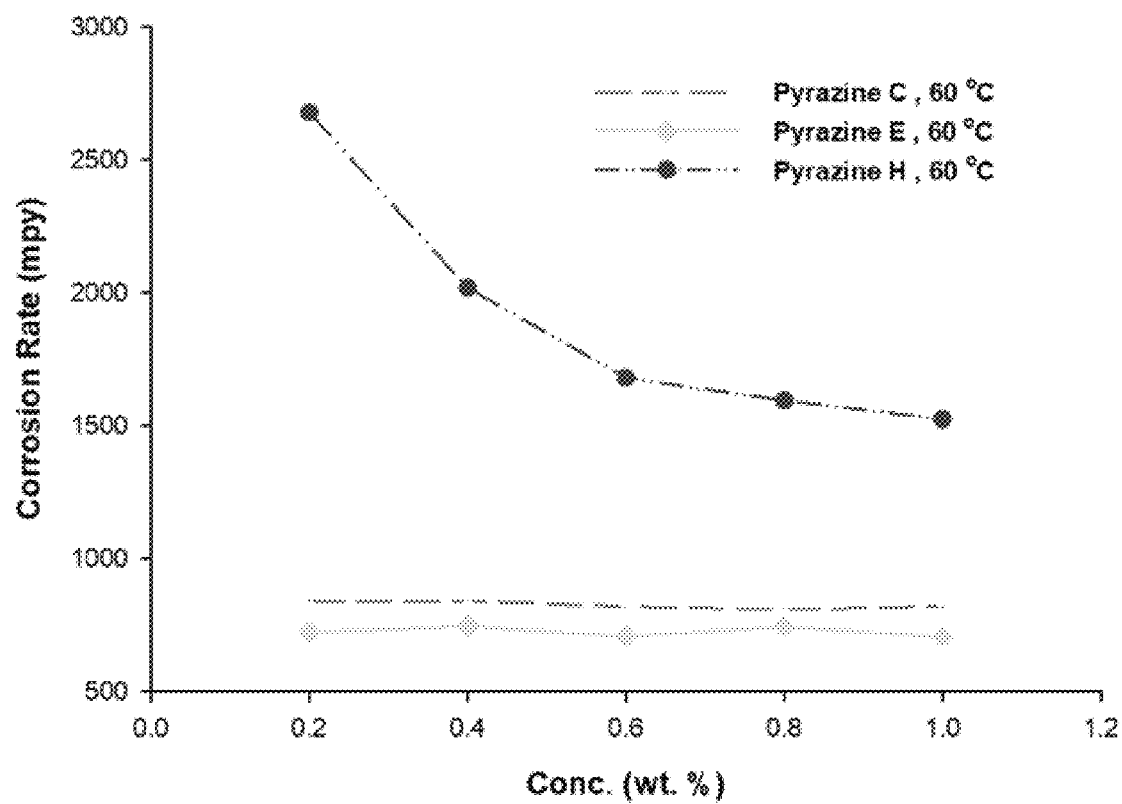
FIGS. 6A-6B are graphs illustrating the variation of corrosion rate with pyrazine C, pyrazine E, and pyrazine H concentration in 15% HCl at (A) 60° C. (B) 90° C.

Considering pyrazine H, FIG. 6A demonstrates that the corrosion rate decreased with increasing concentration at 60° C. The corrosion rate follows the same pattern when the temperature was increased to 90° C. (FIG. 6B). At 60° C., efficiency increased from 19% to 53% when the concentration was increase to 1 wt. % of pyrazine H. As presented in Table 7, it was observed that at 0.2 wt. % concentration of the inhibitor, efficiency increased from 19% to 44% when the temperature was increased to 90° C. This increase in efficiency with both temperature and concentration may be attributed to movement of the desorption-adsorption equilibrium towards adsorption and thermally activated chemisorption and the formation of stronger coordinate bonds. The increase in the efficiency of pyrazine H with increasing concentration indicates that the inhibition performance of pyrazine H is concentration dependent as shown in FIGS. 7A-7B at 60 and 90° C., respectively. See P. Singh, E. E. Ebenso, L. O. Olasunkanmi, I. B. Obot, M. A. Quraishi, Electrochemical, Theoretical, and Surface Morphological Studies of Corrosion Inhibition Effect of Green Naphthyridine Derivatives on Mild Steel in Hydrochloric Acid, J. Phys. Chem. C. 120 (2016) 3408-3419—incorporated herein by reference in its entirety.

Effect of Formulation Additives

In order to enhance the inhibition efficiency of the three pyrazine derivatives, two formulations were prepared where by 0.1 wt. % of sodium iodide (NaI) was added to the 1 wt. % concentration of each inhibitor while in the second formulation 0.01 wt. % Glutathione (Glu) was added to the first formulation. As can be observed in Table 5, adding NaI to pyrazine C at 60° C. increased the inhibition efficiency from 75% to 87%. The efficiency was further increased to 89% when the temperature was increased to 90° C. The efficiency was further increased to 90% at 90° C. test temperature upon the addition of Glu. The inhibition performance enhancement was due the interaction between the ions resulting from the addition of NaI and Glu in the solution and the inhibitor. NaI and Glu enhanced the inhibition performance by forming intermediate bridges between the positive end of the inhibitors and the positively charged metal surface. See S. A. Umoren, M. M. Solomon, Journal of Industrial and Engineering Chemistry Effect of halide ions on the corrosion inhibition efficiency of different organic species—A review, J. Ind. Eng. Chem. 21 (2015) 81-100; and E. Ituen, O. Akaranta, A. James, Green anti-corrosive oil field chemicals from 5-hydroxytryptophan and synergistic additives for X80 steel surface protection in acidic well treatment fluids, J. Mol. Liq. 224 (2016) 408-419—each incorporated herein by reference in their entirety. Addition of NaI and Glu to pyrazine E at 60° C. led to no significant change in the inhibitor efficiency but when the temperature was increased to 90° C., the inhibitor efficiency increased to 89% as shown in Table 6. Adding NaI and Glu to pyrazine H did not cause any significant improvement in the inhibitor performance as compared to pyrazine C and E as presented in Table 7.

TABLE 5

Weight loss results for X60 steel in 15% HCl with and without different concentrations of Pyrazine C at 60 and 90° C. for 6 h.

| System/Concentration | 60° C. | | | 90° C. | | |
|---|---|---|---|---|---|---|
| | Weight loss (g) | Corrosion rate (mpy) | Inhibition efficiency (%) | Weight loss (g) | Corrosion rate (mpy) | Inhibition efficiency (%) |
| Blank (15% HCl) | 1.3577 | 3310.76 | — | 6.9182 | 16870.0 | — |
| 0.2% | 0.3442 | 839.33 | 74.65 | 1.2264 | 2990.59 | 82.27 |
| 0.4% | 0.3447 | 840.55 | 74.61 | 1.1038 | 2691.62 | 84.04 |
| 0.6% | 0.3355 | 818.12 | 75.28 | 1.1609 | 2830.86 | 83.22 |
| 0.8% | 0.3353 | 807.63 | 75.30 | 1.2040 | 2935.96 | 82.59 |
| 1.0% | 0.3357 | 818.61 | 75.27 | 1.0965 | 2673.82 | 84.15 |

TABLE 5-continued

Weight loss results for X60 steel in 15% HCl with and without different concentrations of Pyrazine C at 60 and 90° C. for 6 h.

| | 60° C. | | | 90° C. | | |
|---|---|---|---|---|---|---|
| System/ Concentration | Weight loss (g) | Corrosion rate (mpy) | Inhibition efficiency (%) | Weight loss (g) | Corrosion rate (mpy) | Inhibition efficiency (%) |
| 1% Pyrazine C + 0.1% NaI | 0.1664 | 405.77 | 87.74 | 0.7090 | 1728.90 | 89.75 |
| 1% Pyrazine C + 0.1% NaI + 0.01% Glu | 0.1697 | 413.81 | 87.50 | 0.6889 | 1679.89 | 90.04 |

TABLE 6

Weight loss results for X60 steel in 15% HCl with and without different concentrations of Pyrazine E at 60 and 90° C. for 6 h.

| | 60° C. | | | 90° C. | | |
|---|---|---|---|---|---|---|
| System/ Concentration | Weight loss (g) | Corrosion rate (mpy) | Inhibition efficiency (%) | Weight loss (g) | Corrosion rate (mpy) | Inhibition efficiency (%) |
| Blank (15% HCl) | 1.3577 | 3310.76 | — | 6.9182 | 16870.0 | — |
| 0.2% | 0.2959 | 721.55 | 78.21 | 3.6379 | 8871.05 | 47.42 |
| 0.4% | 0.3055 | 744.96 | 77.49 | 2.9431 | 7176.77 | 57.46 |
| 0.6% | 0.2897 | 706.44 | 78.66 | 2.3469 | 5722.93 | 66.08 |
| 0.8% | 0.3049 | 743.50 | 77.54 | 1.8002 | 4389.80 | 73.98 |
| 1.0% | 0.2889 | 704.48 | 78.72 | 1.7449 | 4254.95 | 74.78 |
| 1% Pyrazine E + 0.1% NaI | 0.2902 | 707.65 | 78.63 | 0.7139 | 1740.85 | 89.68 |
| 1% Pyrazine E + 0.1% NaI + 0.01% Glu | 0.2814 | 686.20 | 79.27 | 0.7204 | 1756.70 | 89.59 |

TABLE 7

Weight loss results for X60 steel in 15% HCl with and without different concentrations of Pyrazine H at 60 and 90° C. for 6 h.

| | 60° C. | | | 90° C. | | |
|---|---|---|---|---|---|---|
| System/ Concentration | Weight loss (g) | Corrosion rate (mpy) | Inhibition efficiency (%) | Weight loss (g) | Corrosion rate (mpy) | Inhibition efficiency (%) |
| Blank (15% HCl) | 1.3577 | 3310.76 | — | 6.9182 | 16870.0 | — |
| 0.2% | 1.0988 | 2679.43 | 19.07 | 3.9959 | 9744.03 | 42.24 |
| 0.4% | 0.8279 | 2018.84 | 39.02 | 3.8778 | 9456.04 | 43.95 |
| 0.6% | 0.6889 | 1679.89 | 49.26 | 3.6058 | 8792.77 | 47.88 |
| 0.8% | 0.6540 | 1594.78 | 51.83 | 3.5621 | 8686.21 | 48.51 |
| 1.0% | 0.6250 | 1524.07 | 53.97 | 3.3716 | 8221.67 | 51.26 |
| 1% Pyrazine H + 0.1% NaI | 0.3156 | 769.59 | 76.75 | 2.3362 | 5696.84 | 66.23 |
| 1% Pyrazine H + 0.1% NaI + 0.01% Glu | 0.4673 | 1139.45 | 65.58 | 2.1027 | 5127.45 | 69.60 |

Surface Characterizations
SEM/EDX

Figure 8A:
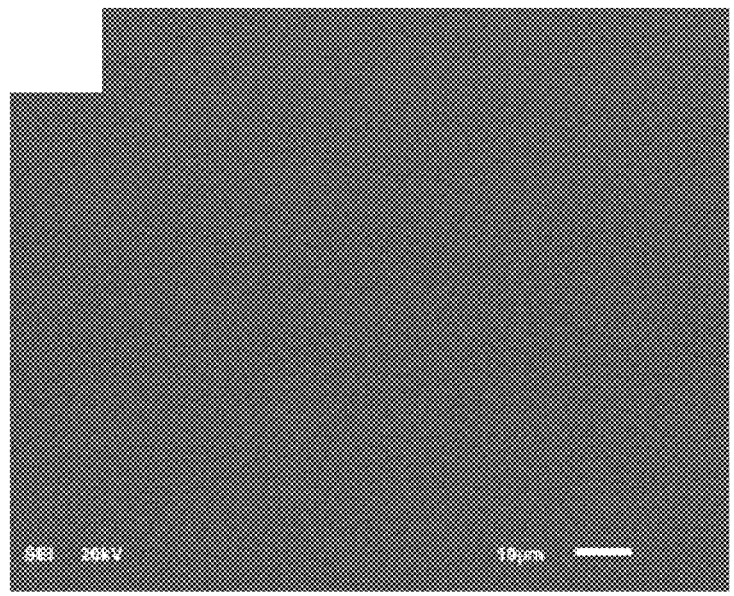
FIGS. 8A-8E are SEM micrographs of (A) Polished X60 steel, (B) X60 steel coupon in blank (C) X60 Steel specimen immersed in 1 wt. % pyrazine C (D) X60 Steel specimen immersed in 1% wt. pyrazine E (E) X60 Steel specimen immersed in 1% wt. pyrazine H.
Figure 8B:
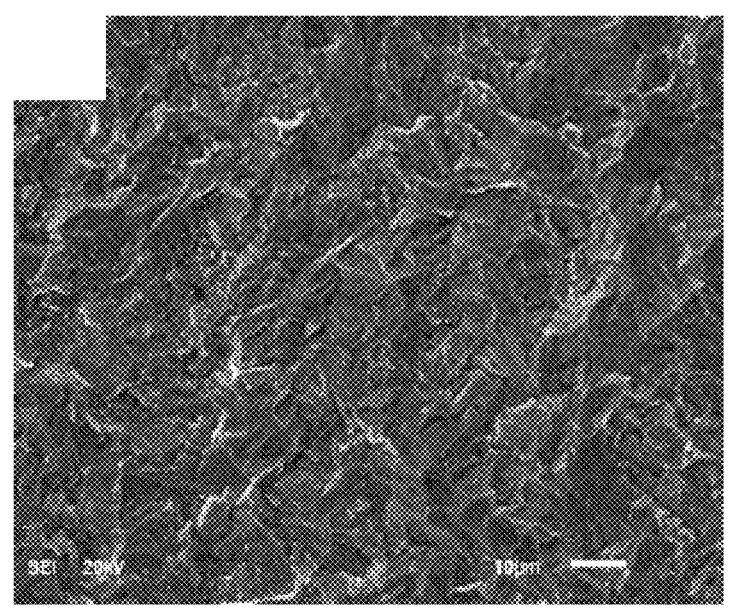
Figure 8C:
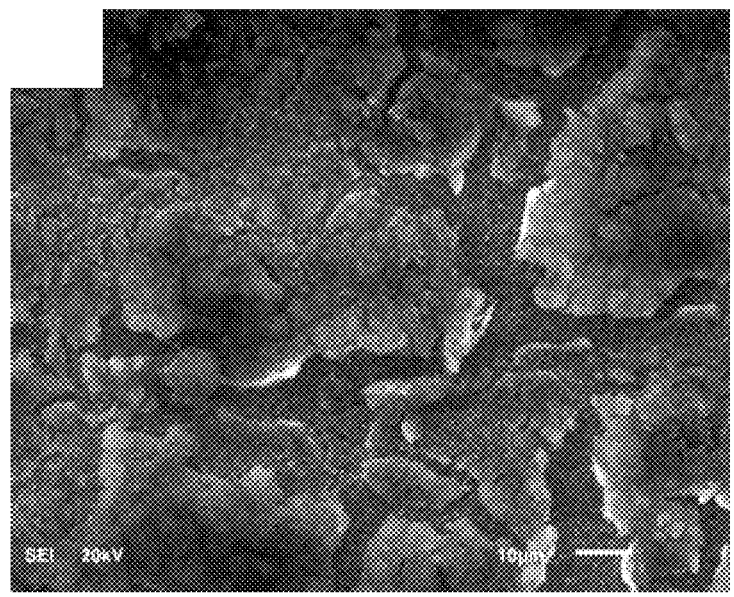
Figure 8D:
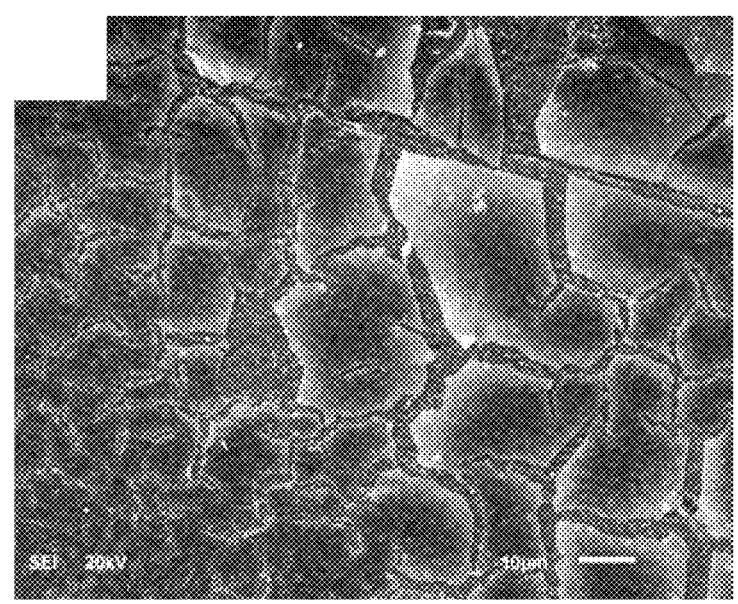
Figure 8E:
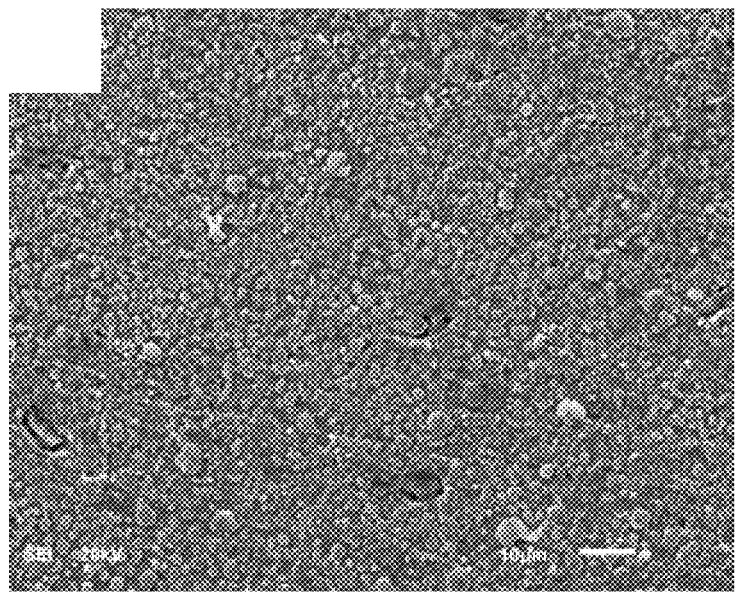

Representative SEM micrographs of the X60 steel coupons utilized are presented in FIGS. 8A-8E. FIG. 8A illustrates a mirror polished coupon with a very smooth surface. However, the surface of the steel was severely damaged when immersed in 15% HCl as shown in FIG. 8B. FIGS. 8C, 8D, and 8E illustrate the surface of the steel coupons after they were immersed in 15% HCl solution containing pyrazine C, E and H, respectively. It can be seen from FIGS. 8C and 8D that the surface coverage of the films formed by pyrazine C and E, respectively, were much more than that of pyrazine H, shown in FIG. 8E. The higher the surface coverage of the film the better the underlying metal is protected from the corrosive media. It is worth noting that the films formed in pyrazine H shown in FIG. 8E were not protective enough hence the acid was able to attack the active sites on the metal surface leading to high corrosion rate as compared to pyrazine C and E that has relatively lower corrosion rates at both test temperatures.

Figure 9A:
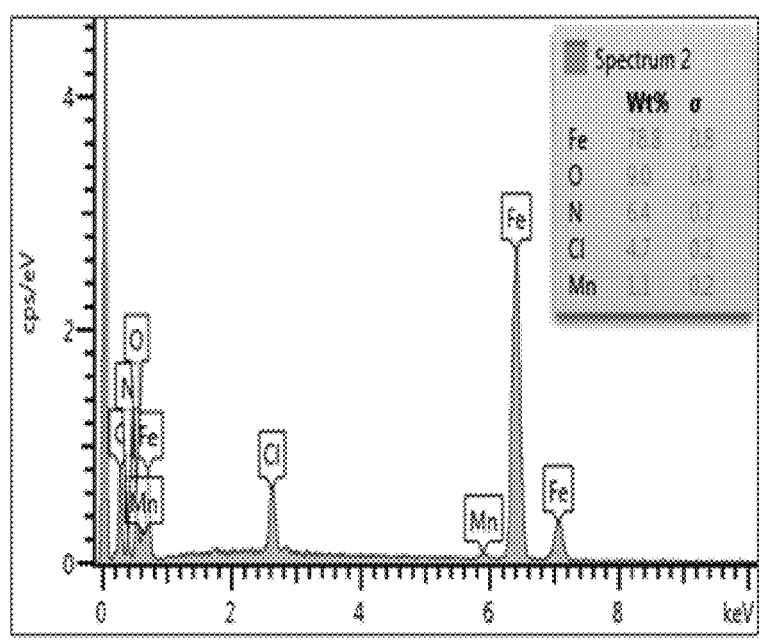
FIGS. 9A-9C are EDX spectra of X60 steel specimens after immersion in (A) 1 wt. % Pyrazine C (B) 1% wt. Pyrazine E and (C) 1% wt. Pyrazine H for 6 h.
Figure 9B:
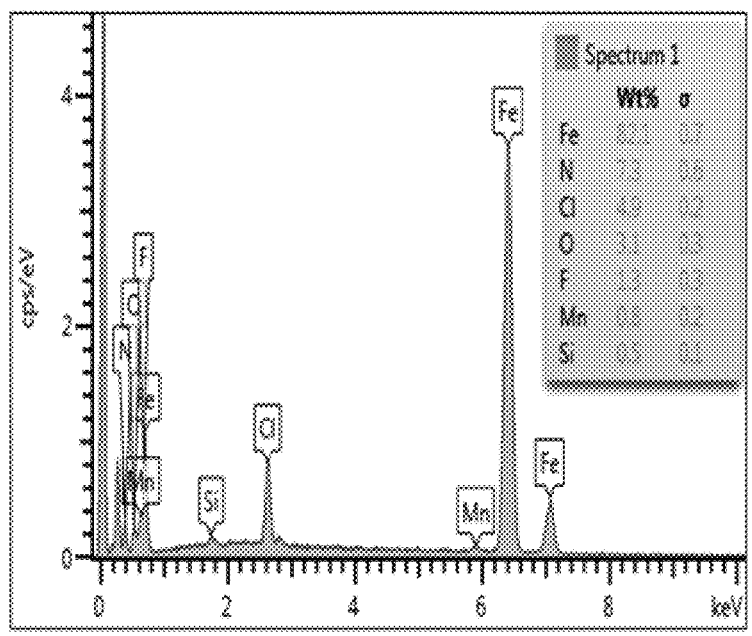
Figure 9C:
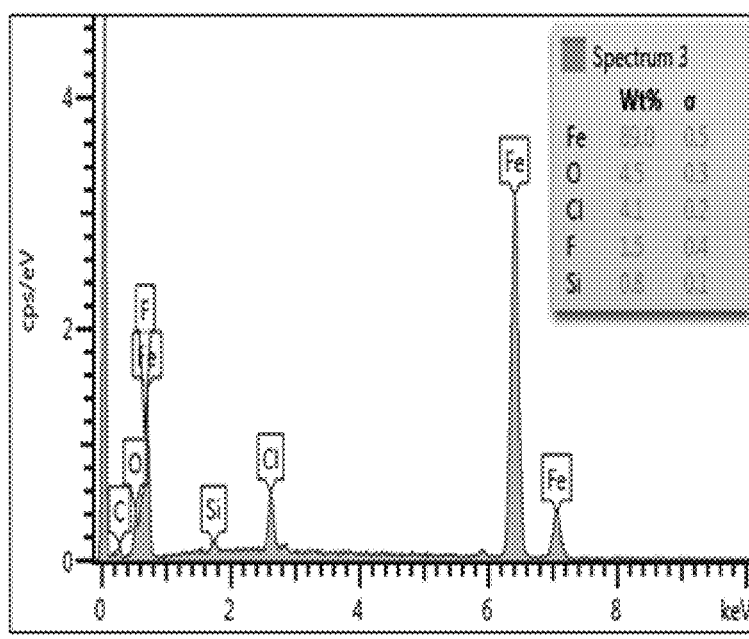

EDX was utilized to extract information regarding the surface elemental composition. FIGS. 9A-9C illustrate the EDX spectrum of X60 steel specimens immersed in 1 wt. % of pyrazine C, E and H, respectively. FIG. 9A showed peaks of Fe that were largely suppressed in the presence of pyrazine C compared to that of coupons immersed in pyrazine E and H in FIGS. 9B and 9C, respectively. This clearly indicates that there was more metal complex formation in pyrazine C than that of E and H, respectively.

FTIR

Figure 10A:
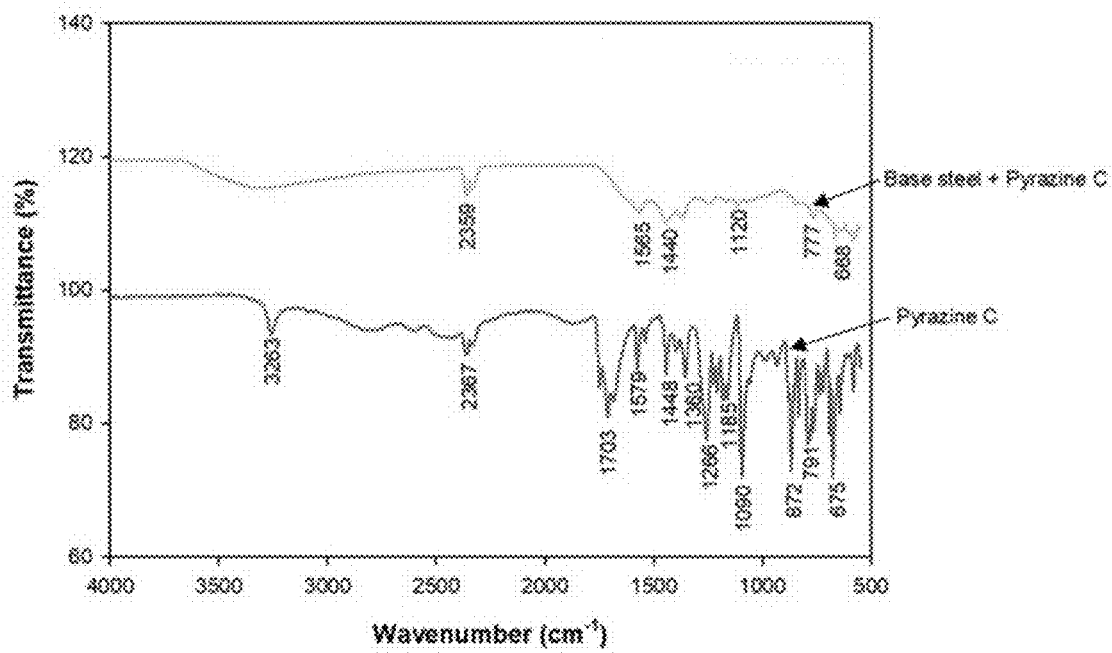
FIGS. 10A-10C are graphs illustrating the FTIR spectra of (A) pure pyrazine C and that of the base steel+pyrazine, (B) pure pyrazine E and that of the base steel+pyrazine E and (C) pure pyrazine H and that of the base steel+pyrazine H.

FTIR was utilized to probe the mechanism of interaction and ascertain the functional groups that took part in the adsorption process on the metal surface. FIG. 10A illustrates FTIR results obtained on the pure pyrazine C and that of the films scrapped from the base steel immersed in the 1 wt. % solution of pyrazine C. The peaks in the pure inhibitor at 3263 cm$^{-1}$ was ascribed to O—H stretching which completely disappeared to a very broad peak in 1 wt. % solution of the inhibitor. The peak at 2367 cm$^{-1}$ was assigned to C—N triple bond stretching and was present in the base steel+pyrazine C at 2359 cm$^{-1}$. The peak at 1703 cm$^{-1}$ in the pure inhibitor was ascribed to —C=O bond stretching which disappeared completely in 1 wt. % solution of the inhibitor. The peak at 1448 cm$^{-1}$ was assigned to O—H bending and this was observed at 1440 cm$^{-1}$ for the base steel in pyrazine C solution. The peaks at 1360-1185 cm$^{-1}$ in the pure inhibitor were assigned to C—N stretching and these peaks completely disappeared in the base steel+pyrazine C. The peaks at 872, 791, 657 cm$^{-1}$ were attributed to C—H stretching and were diminished on the base steel+pyrazine.

Figure 10B:
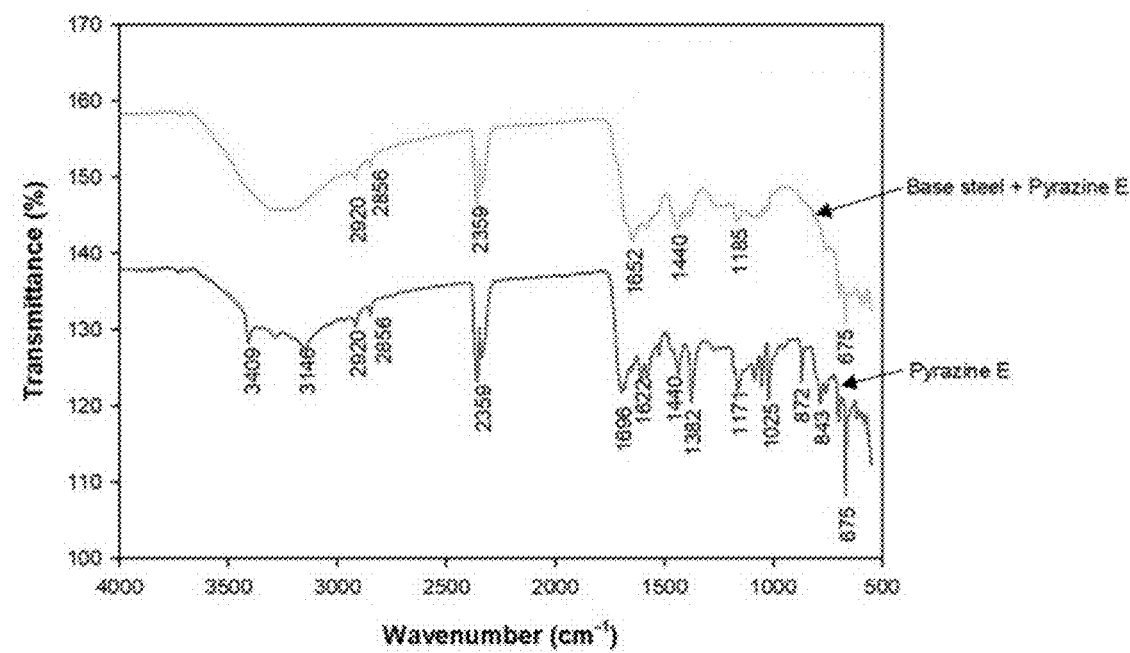

FIG. 10B illustrates the IR spectra of pure pyrazine E and that of the base steel+pyrazine E. The peak at 3409 and 3146 cm were attributed to O—H stretching in the pure inhibitor and were completely diminished to a broad peak in the base steel+pyrazine E. Peaks at 2920 and 2856 cm$^{-1}$ were attributed to N—H stretching's in both the pure inhibitor and base steel+pyrazine E. The peak at 2359 cm$^{-1}$ was ascribed to C—N bond stretching and was clearly shown in the base steel+pyrazine E as well. The peak at 1696 cm$^{-1}$ in the pure inhibitor was attributed to C=O bond stretching, and this was observed in the base steel+pyrazine E at 1652 cm$^{-1}$. The peak at 1622 cm was attributed to N—H bending and was diminished in the base steel+pyrazine E. The peak at 1382 cm$^{-1}$ was attributed to strong C—N stretching whiles the peaks at 1171 and 1025 cm$^{-1}$ were attributed to medium C—N stretching and these peaks were entirely diminished in the base steel+pyrazine E except for weak peak seen at 1185. The peaks at 873, 842 and 675 cm$^{-1}$ were assigned to strong C—H bending in the pure inhibitor and these were diminished in the base steel+pyrazine E except for the peak at 675 that was observed in the base steel+pyrazine E.

Figure 10C:
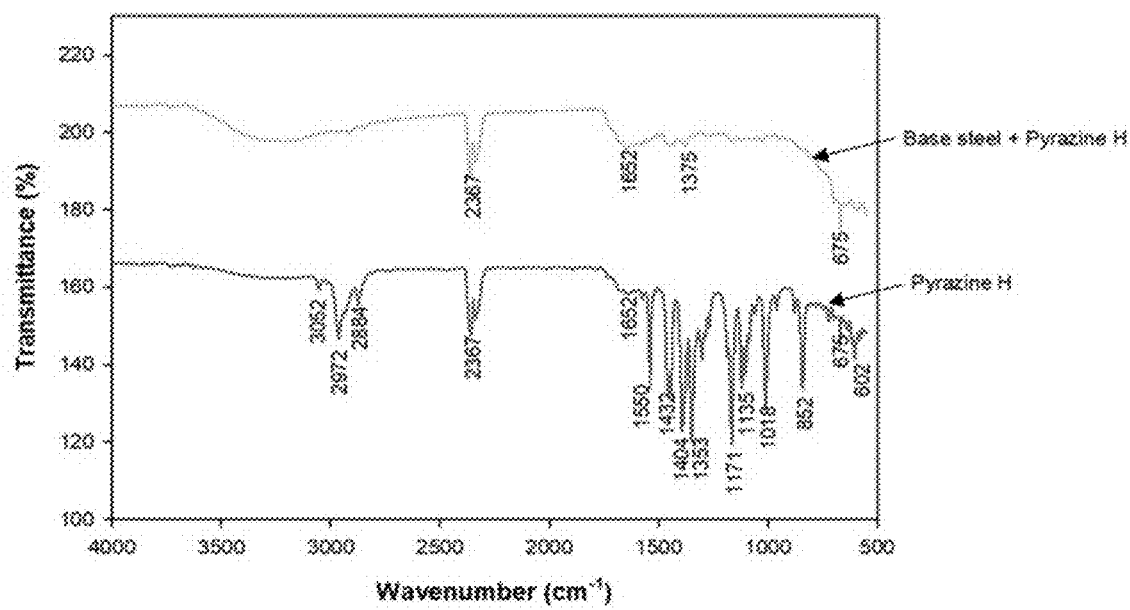

FIG. 10C illustrates the IR spectra of pure pyrazine H and that of the base steel+pyrazine H. The peak at 3052 cm$^{-1}$ in the pure inhibitor was attributed to strong C—H stretching's and this was completely diminished in the base steel+pyrazine H. Peaks at 2972 and 2884 cm$^{-1}$ were attributed to medium C—H stretching and these peaks completely diminished in the base steel+pyrazine H. The peak due to C—N stretching was present at 2367 cm-1 in both the pure inhibitor and that of the base steel+pyrazine H. The peak at 1652 cm was attributed to weak C=N stretching, and this was clearly shown in the base steel+pyrazine H. The peaks at 1171, 1135, and 1018 cm$^{-1}$ were ascribed to C—O stretching and these were diminished in the base steel+pyrazine H. Peaks at 852, 675 and 602 cm$^{-1}$ were attributed to C—H bending. The peak at 675 cm$^{-1}$ was clearly shown in the base steel+pyrazine H. The presence of —OH, —C=N, C=C and aromatic ring provide active sites for inhibitor interaction with surface of the metal.

Mechanism of Inhibition

Figure 11A:
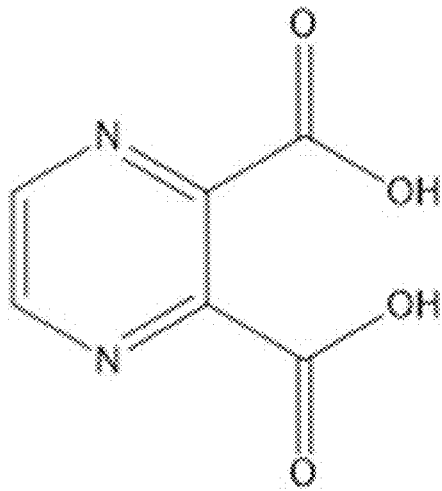
FIGS. 11A-11C are 2D-molecular structures of the major microspecies of the investigated three pyrazine molecules in strong acidic pH aqueous solution using Marvin-Beans software.
Figure 11B:
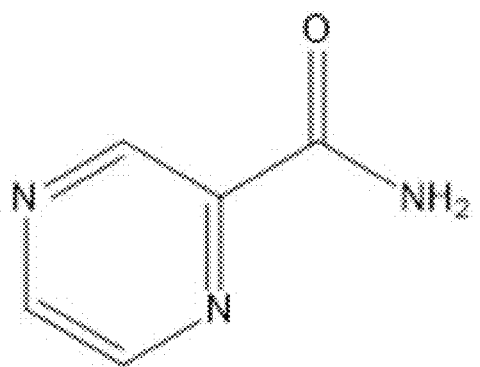
Figure 11C:
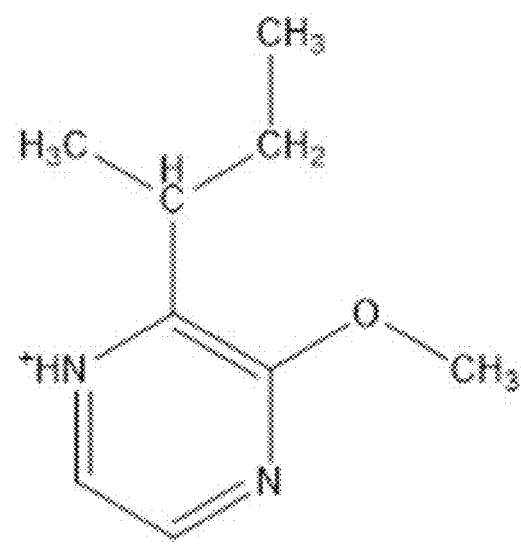

The inhibition mechanism of corrosion can be analyzed based on the inhibitor adsorption onto surface of the steel. Adsorption of organic compounds usually works by either physical or chemical processes and sometimes both adsorption processes occur simultaneously. Factors such as inhibitor charge, molecular structure and metal surface determines the adsorption process. The three pyrazine derivatives studied contain functional groups such as aromatic ring, C=O, C—O, OH, N—H, C=C, and N that act as centers of adsorption during the inhibitor adsorption process and the ability of these functional groups to transfer an electron to the d-orbital of the metal is significant in the adsorption process. See D. Q. Dao, T. D. Hieu, T. Le Minh Pham, D. Tuan, P. C. Nam, I. B. Obot, DFT study of the interactions between thiophene-based corrosion inhibitors and an Fe4 cluster, J. Mol. Model. 23 (2017) 260—incorporated herein by reference in its entirety. 2D-molecular structures of the major microspecies of the investigated three pyrazine molecules in strong acidic pH aqueous solution obtained using a semi-empirical computational method in Marvin-Beans software are illustrated in FIGS. 11A-11C. It can be clearly seen from FIGS. 11A-11C that, only pyrazine H was protonated in the acid (FIG. 11C). Pyrazine C and E remained neutral molecules in the acid solution. The proposed mechanism of inhibition was based on these calculations coupled with the results obtained in the FTIR analysis.

Figure 12:
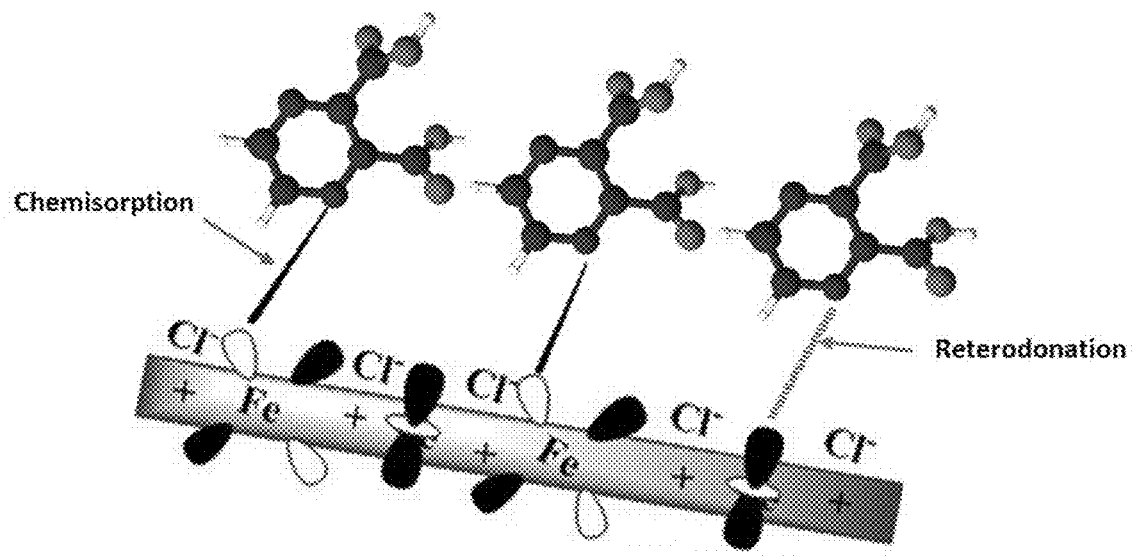
FIG. 12 is a proposed mechanism of corrosion inhibition in pyrazine C.
Figure 13:
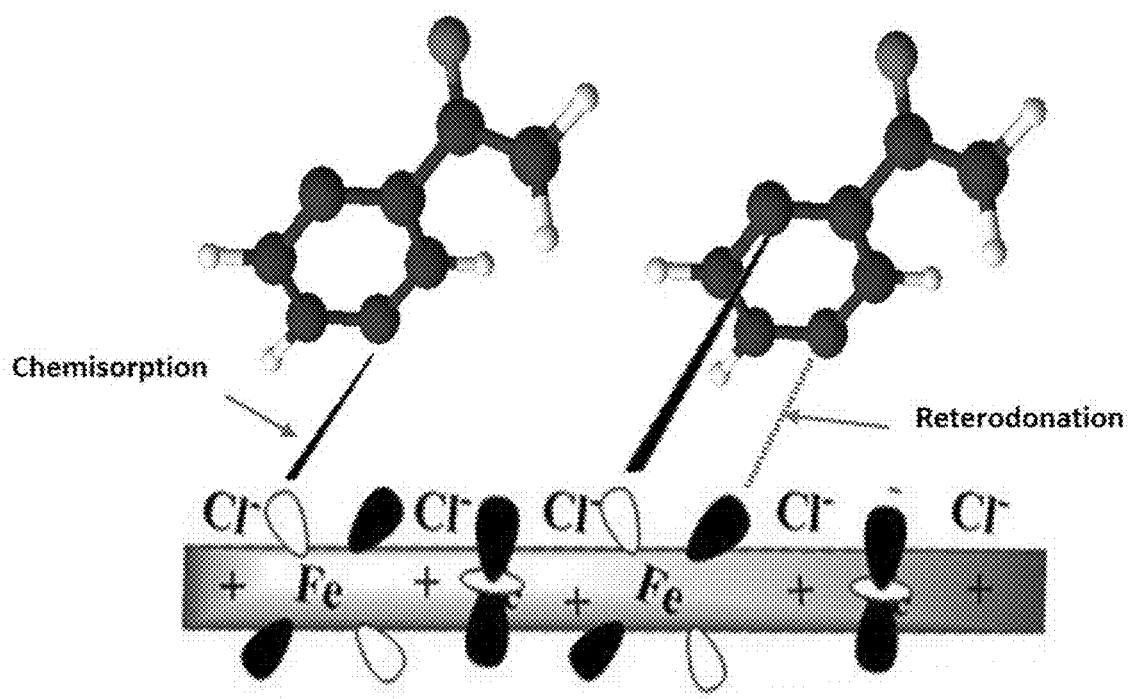
FIG. 13 is a proposed mechanism of corrosion inhibition in pyrazine E.
Figure 14:
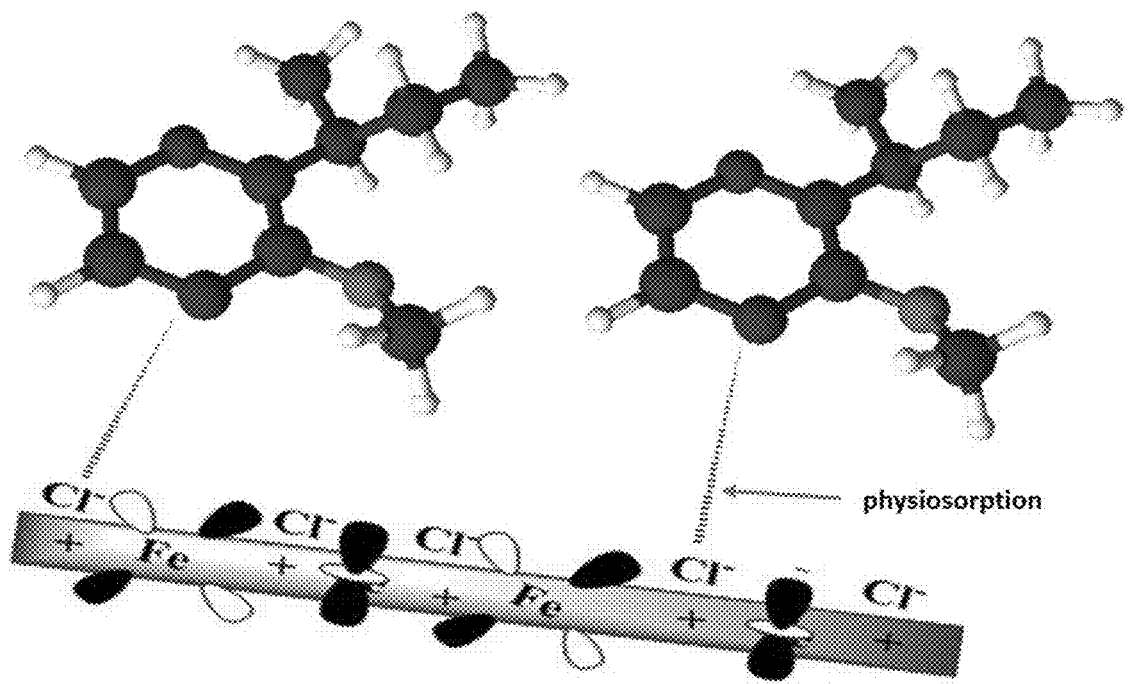
FIG. 14 is a proposed mechanism of corrosion inhibition in pyrazine H.

The predominant corrosion inhibition mechanism observed in pyrazine C and E is chemisorption as illustrated in FIGS. 12 and 13, respectively. Adsorption was as a result of chemical interactions of unshared electron pairs of nitrogen and empty d-orbital of Fe. Acceptor-donor interactions between the pi electrons of the aromatic ring and Fe also results in inhibitor adsorption on the surface. The rate of chemisorption increased with temperature. Adsorption process that was believed to have dominated in the presence of pyrazine H was the protonation of N atom and subsequent adsorption on the steel by negatively charged Cl$^-$ ions through electrostatic interaction. See I. B. Obot, N. K. Ankah, A. Sorour, Z. M. Gasem, K. Haruna, 8-Hydroxyquinoline as an alternative green and sustainable acidizing oilfield corrosion inhibitor, Sustain. Mater. Technol. 14 (2017) 1-10; H. Lgaz, R. Salghi, K. Subrahmanya Bhat, A. Chaouiki, Shubhalaxmi, S. Jodeh, Correlated experimental and theoretical study on inhibition behavior of novel quinoline derivatives for the corrosion of mild steel in hydrochloric acid solution, J. Mol. Liq. 244 (2017) 154-168—each incorporated herein by reference in their entirety. The proposed mechanism in pyrazine H is illustrated in FIG. 14. The rate of physiosorption decreased with increased in temperature. It is clear from FIGS. 12-14, that immersing steel coupons in the blank HCl resulted in metal dissolution whereas addition of pyrazine led to inhibitor adsorption on the steel surface through chemisorption and physiosorption. As seen in FIGS. 12-14, pyrazine adsorbed flat on the surface of the steel at all coverages and forms a superstructure. See U. W. Hamm, V. Lazarescut, D. M. Kolb, Adsorption of pyrazine on Au(111) and Ag(111) electrodes an ex situ XPS study, J. Chem. Soc. Faraday Trans. 92 (1996) 3785-3790—incorporated herein by reference in its entirety. This process reduces hydrogen evolution by competing with the hydrogen ions for electrons on the metal. After H$_2$ evolution, inhibitor goes back to its neutral state with free lone electron pairs. See P. Singh, V. Srivastava, M. A. Quraishi, Novel quinoline derivatives as green corrosion inhibitors for mild steel in acidic medium: Electrochemical, SEM, AFM, and XPS studies, J. Mol. Liq. 216 (2016) 164-173—incorporated herein by reference in its entirety. The process is achieved without altering the hydrogen evolution mechanism. See W. Zhang, R. Ma, H. Liu, Y. Liu, S. Li, L. Niu, Electrochemical and surface analysis studies of 2-(quinolin-2-yl)quinazolin-4(3H)-one as corrosion inhibitor for Q235 steel in hydrochloric acid, J. Mol. Liq. 222 (2016) 671-679—incorporated herien by reference in its entirety. The difference in inhibition performance of the three pyrazine derivatives studied was attributed the attachment of the different substituent groups as shown in FIGS. 1A-1C. The three pyrazine derivatives contain nitrogen atoms having lone electron pairs that could be adsorbed on the metal. The better performance of pyrazine C and E compared to H could partially be attributed the presence of additional bonds such as O—H, C=O and N—H bonds with available 7-electrons that can donate electrons to empty d-orbital Fe to form covalent bond. See D. Huang, Y. Tu, G. Song, X. Guo, E. T. Al, Inhibition Effects of Pyrazine and Piperazine on the Corrosion of Mg-10Gd-3Y-0.5Zr Alloy in an Ethylene Glycol Solution, 2013 (2013) 36-38; and J. Saranya, P. Sounthari, K. Parameswari, S. Chitra, Acenaphtho[1,2-b]quinoxaline and acenaphtho[1,2-b]pyrazine as corrosion inhibitors for mild steel in acid medium, Meas. J. Int. Meas. Confed. 77 (2016) 175-185—each incorporated herein by reference in their entirety.

Corrosion of X60 steel was monitored in laboratory simulated well acidizing conditions with and without different concentrations of pyrazine C, E and H in 15% HCl at 60° C. and 90° C. for 6 hours and electrochemical measurements at 25° C. to investigate their inhibition performance. The three pyrazine derivatives investigated functioned as effective corrosion inhibitors on X60 steel corrosion in 15% HCl. However, inhibition efficiency were concentration and temperature dependent. The addition of sodium Iodide (NaI) and Glutathione (Glu) enhanced the inhibition performance of pyrazine C and E but has no significant effect on pyrazine H at 60 and 90° C. Electrochemical studies indicate that the three pyrazine derivatives are mixed typed with pyrazine C and H predominantly cathodic inhibitors whereas pyrazine E is predominantly anodic.

Inhibition performance followed the order: pyrazine E>pyrazine C>pyrazine H at 60° C., while the inhibition efficiency followed the order: pyrazine C>pyrazine E>pyrazine H at 90° C.

The presence of —OH, —C=N, C=C and aromatic ring provide active sites for inhibitor interaction with surface of the metal according to the results of the FTIR spectroscopy.

SEM-EDX confirms the inhibition effect of three pyrazine derivatives on steel in 15% HCl as compared to the uninhibited solution.

The invention claimed is:

1. A method of inhibiting corrosion of a metal tubing during acid stimulation of an oil and gas well, the method comprising:
concurrently injecting an emulsion of an aqueous acidic treatment fluid and an oil comprising 10 to 28 wt. % of an acid, based on a total weight of the aqueous acidic treatment fluid, and 0.01 to 5% of a pyrazine corrosion inhibitor by weight per total volume of the acidic treatment fluid into the oil and gas well, and
allowing the pyrazine corrosion inhibitor to contact a surface of the metal tubing in the oil and gas well,
wherein the pyrazine corrosion inhibitor inhibits corrosion of the metal tubing, and
wherein the pyrazine corrosion inhibitor is at least one selected from the group consisting of 2,3-pyrazine dicarboxylic acid, and 2-methoxy-3-(1-methylpropyl) pyrazine,
wherein the aqueous acidic treatment fluid further comprises 0.01 to 0.5% of an intensifier by weight per total volume of the aqueous acidic treatment fluid, and wherein the intensifier is at least one selected from the group consisting of CuI, KI, and NaI and
wherein the aqueous acidic treatment fluid further comprises 0.001 to 0.5% of a sulfur-containing compound by weight per total volume of the aqueous acidic treatment fluid, wherein the sulfur-containing compound is at least one selected from the group consisting of a mercapto heteroarene, a thioglycol compound, and a thiourea compound.

2. The method of claim 1, wherein the pyrazine corrosion inhibitor is present in the aqueous acidic treatment fluid in a concentration of 0.2 to 1% by weight per total volume of the aqueous acidic treatment fluid.

3. The method of claim 1, wherein the pyrazine corrosion inhibitor is 2,3-pyrazine dicarboxylic acid, and wherein the 2,3-pyrazine dicarboxylic acid is present in the aqueous acidic treatment fluid in a concentration of 0.2 to 1% by weight per total volume of the aqueous acidic treatment fluid.

4. The method of claim 1, wherein the pyrazine corrosion inhibitor is 2-methoxy-3-(1-methylpropyl) pyrazine, and wherein the 2-methoxy-3-(1-methylpropyl) pyrazine is present in the aqueous acidic treatment fluid in a concentration of 0.6 to 1% by weight per total volume of the aqueous acidic treatment fluid.

5. The method of claim 1, wherein the intensifier is NaI.

6. The method of claim 1, wherein the acid is HCl and wherein the aqueous acidic treatment fluid comprises 14 to 16 wt. % HCl, based on a total weight of the aqueous acidic treatment fluid.

7. The method of claim 1, wherein the metal tubing is carbon steel.

* * * * *